United States Patent
Seol et al.

(10) Patent No.: US 10,846,505 B2
(45) Date of Patent: Nov. 24, 2020

(54) MOBILE TERMINAL AND OPERATING METHOD THEREFOR

(71) Applicant: LG ELECTRONICS INC., Seoul (KR)

(72) Inventors: Jie Seol, Seoul (KR); Soyeon Yim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 134 days.

(21) Appl. No.: 15/771,336

(22) PCT Filed: Oct. 29, 2015

(86) PCT No.: PCT/KR2015/011497
§ 371 (c)(1),
(2) Date: Apr. 26, 2018

(87) PCT Pub. No.: WO2017/073811
PCT Pub. Date: May 4, 2017

(65) Prior Publication Data
US 2018/0365477 A1 Dec. 20, 2018

(51) Int. Cl.
*G06K 9/00* (2006.01)
*H04M 1/725* (2006.01)
(Continued)

(52) U.S. Cl.
CPC ....... *G06K 9/00087* (2013.01); *G06F 3/0486* (2013.01); *G06F 3/0488* (2013.01);
(Continued)

(58) Field of Classification Search
CPC ............ G06K 9/00087; G06K 9/00013; G06F 3/0486; G06F 3/0488; G06F 21/32;
(Continued)

(56) References Cited

U.S. PATENT DOCUMENTS 10,452,178 B2* 10/2019 Cho ..................... G06F 3/04886
2014/0189523 A1* 7/2014 Shuttleworth ........ G06F 3/0481
715/741
(Continued)

FOREIGN PATENT DOCUMENTS

JP 2011-109199 A 6/2011
KR 10-2015-0045205 A 4/2015
(Continued)

*Primary Examiner* — Leon Viet Q Nguyen
(74) *Attorney, Agent, or Firm* — Birch, Stewart, Kolasch & Birch, LLP

(57) ABSTRACT

A mobile terminal according to one embodiment of the present disclosure comprises: a display unit including a fingerprint recognizable area in which a fingerprint can be recognized, and a fingerprint non-recognition area in which the fingerprint cannot be recognized; a fingerprint recognition sensor embedded on the lower end of the display unit so as to correspond to the fingerprint recognizable area, and recognizing the fingerprint inputted to the display unit; and a control unit for controlling the fingerprint recognition sensor such that the fingerprint inputted simultaneously with a drag operation is recognized if the drag operation, of moving the finger from any one of the fingerprint recognizable area and the fingerprint non-recognition area to the other one while making contact therewith, is inputted into the display unit, and for executing a security home screen or a basic home screen according to whether fingerprint authentication performed on the basis of the fingerprint recognized by the fingerprint recognition sensor has been successful.

14 Claims, 28 Drawing Sheets

(51) Int. Cl.
*G06F 3/0486* (2013.01)
*G06F 3/0488* (2013.01)
*G06F 21/32* (2013.01)

(52) U.S. Cl.
CPC ......... *G06F 21/32* (2013.01); *G06K 9/00013* (2013.01); *H04M 1/725* (2013.01); *H04M 1/72519* (2013.01); *G06F 2221/2105* (2013.01)

(58) Field of Classification Search
CPC .......... G06F 2221/2105; H04M 1/725; H04M 1/72519; H04W 88/02
See application file for complete search history.

(56) References Cited

U.S. PATENT DOCUMENTS

| | | | |
|---|---|---|---|
| 2015/0169163 A1 | 6/2015 | Lee et al. | |
| 2016/0042166 A1* | 2/2016 | Kang | G06F 21/32 726/7 |
| 2017/0116453 A1* | 4/2017 | Ganapathi | G06F 3/041 |

FOREIGN PATENT DOCUMENTS

| | | |
|---|---|---|
| KR | 10-2015-0054552 A | 5/2015 |
| KR | 10-2015-0092964 A | 8/2015 |

* cited by examiner

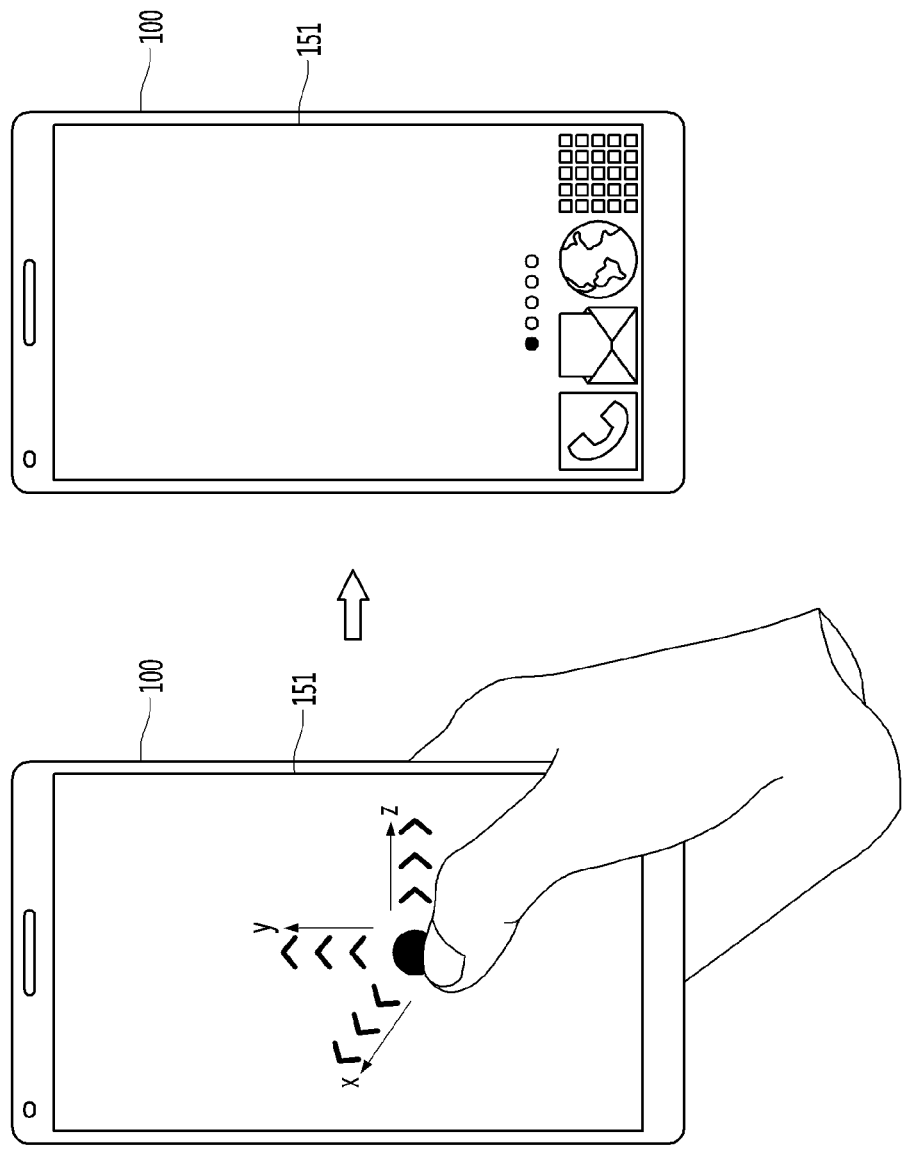

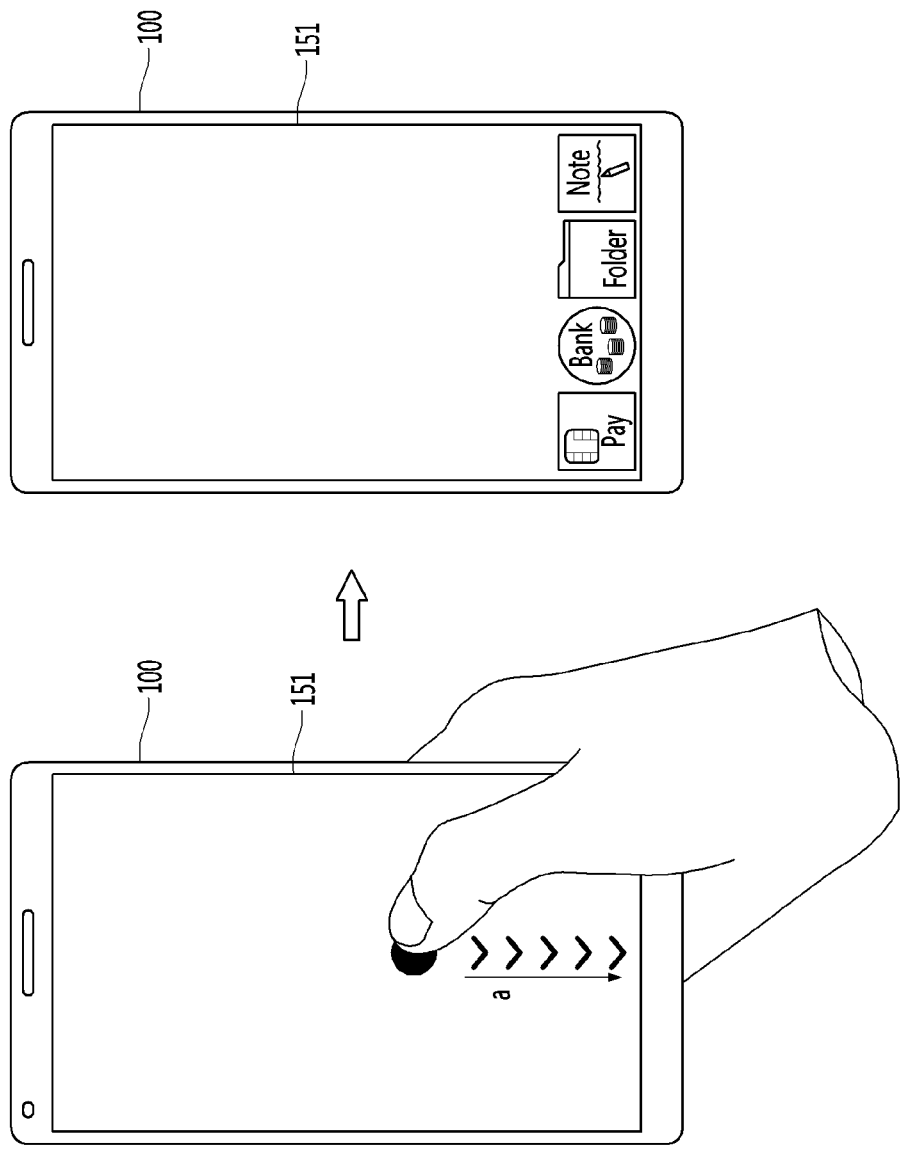

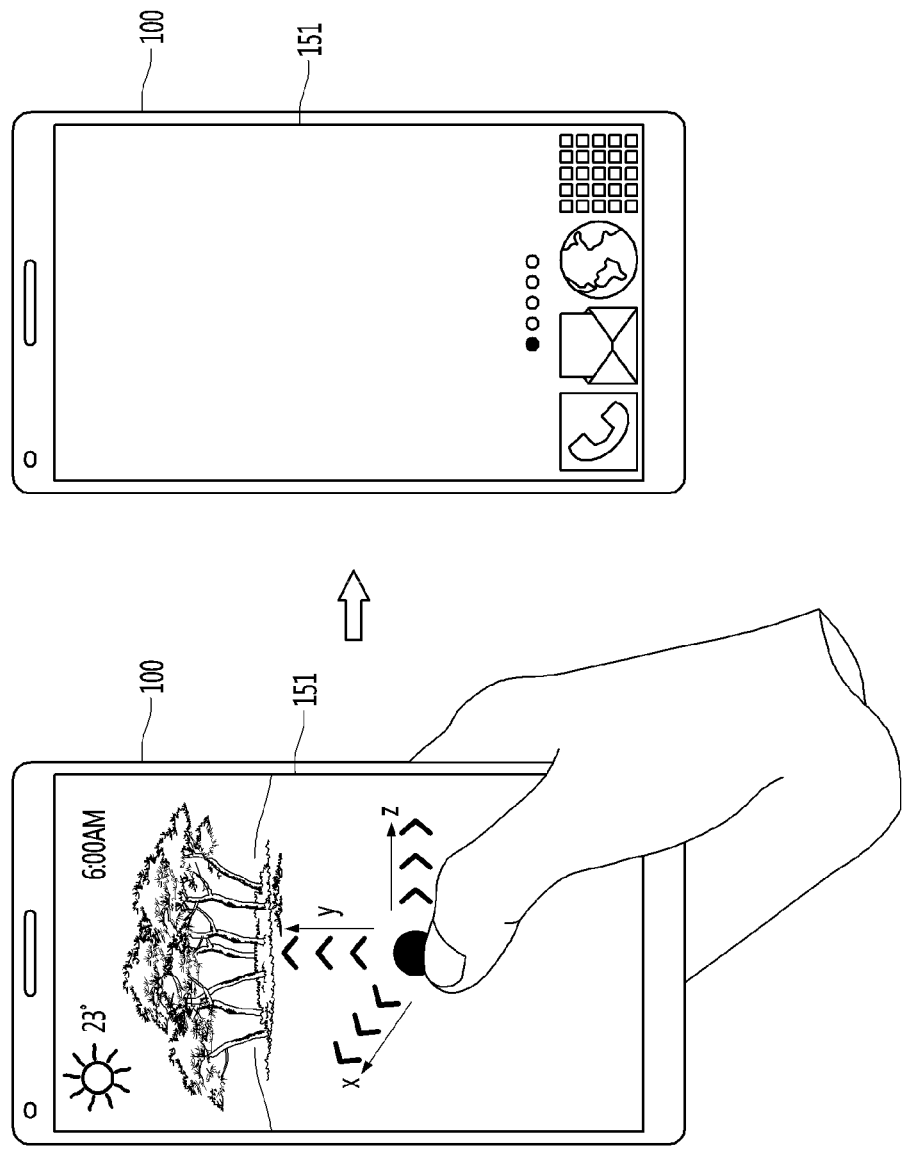

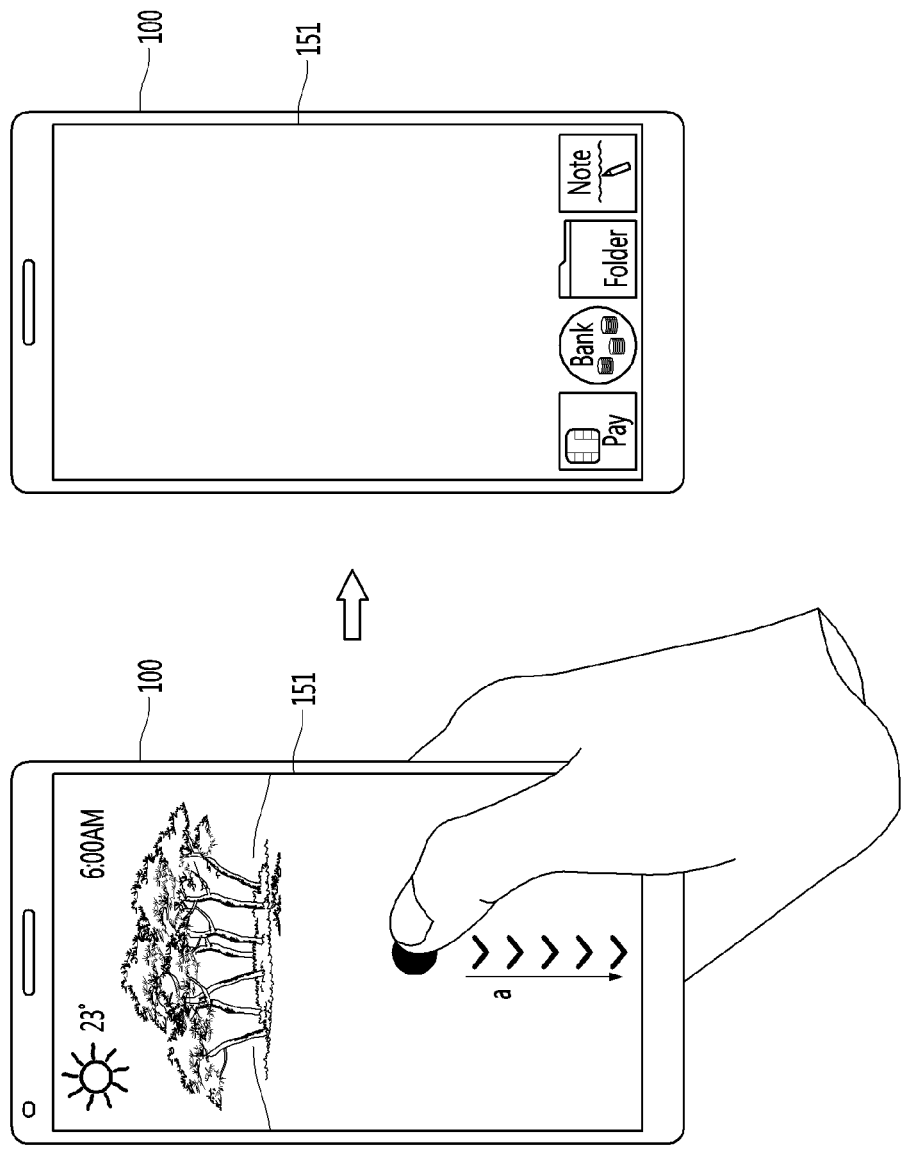

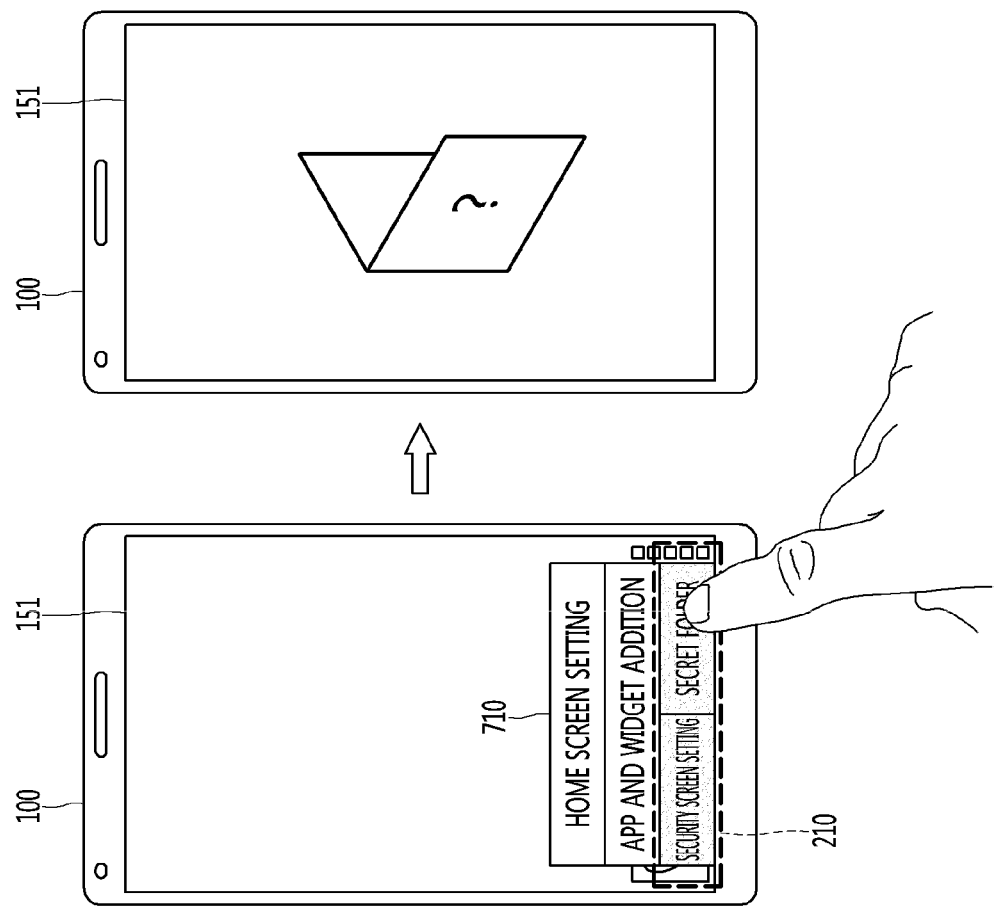

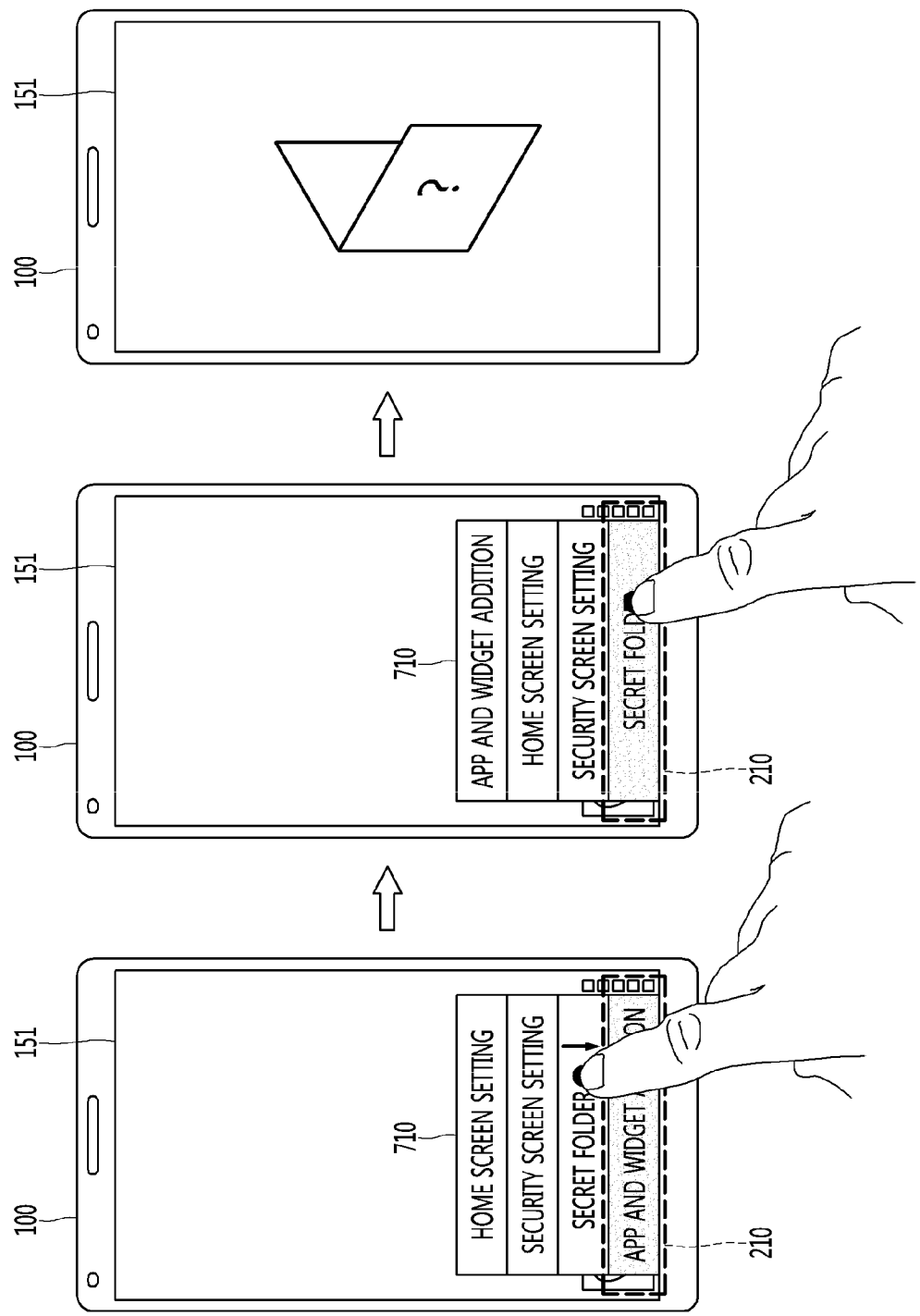

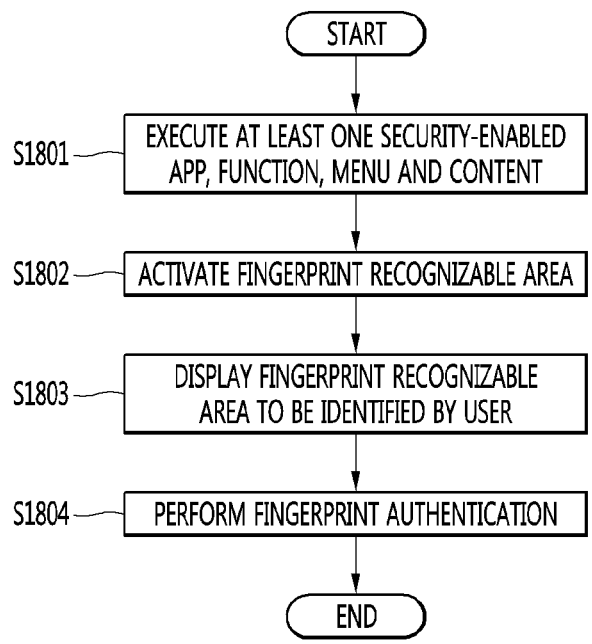

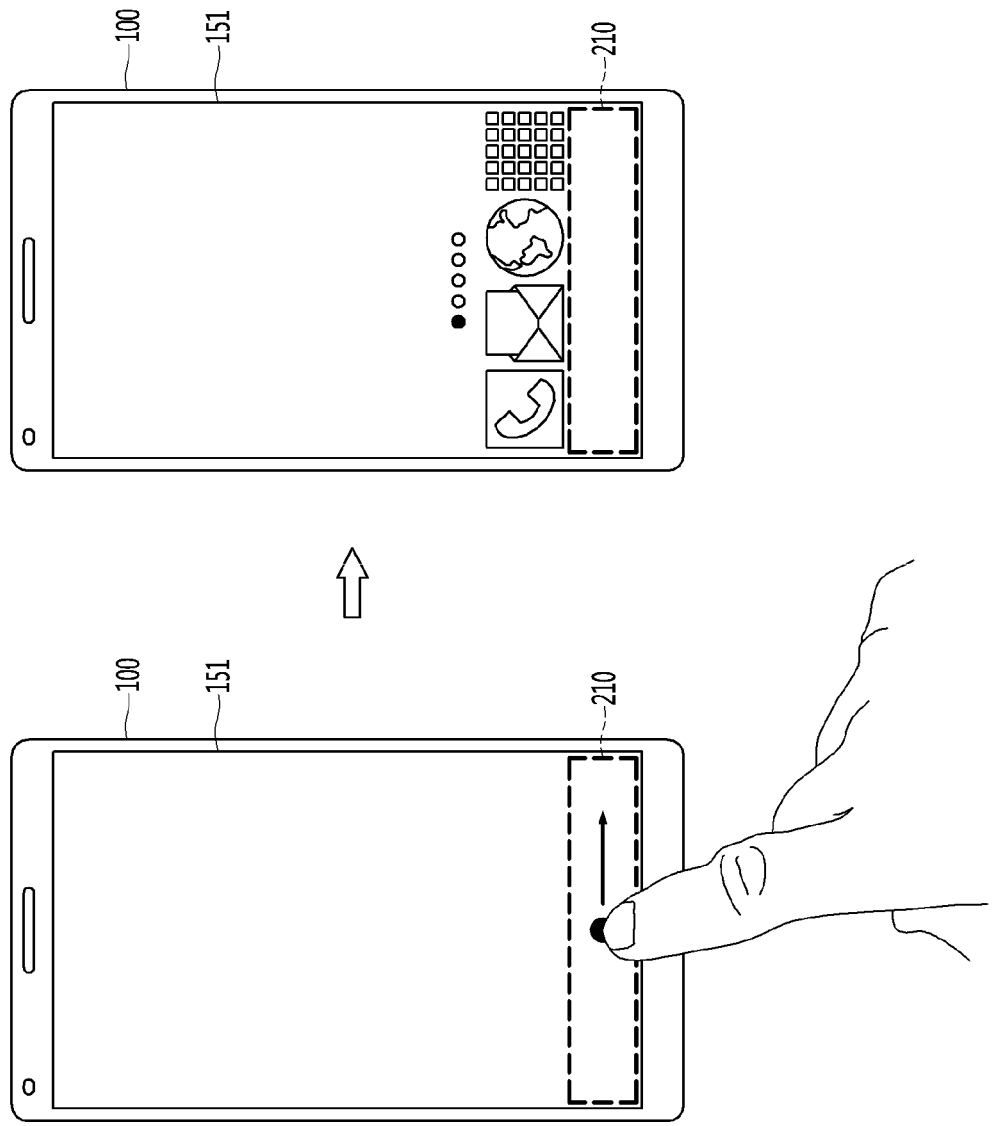

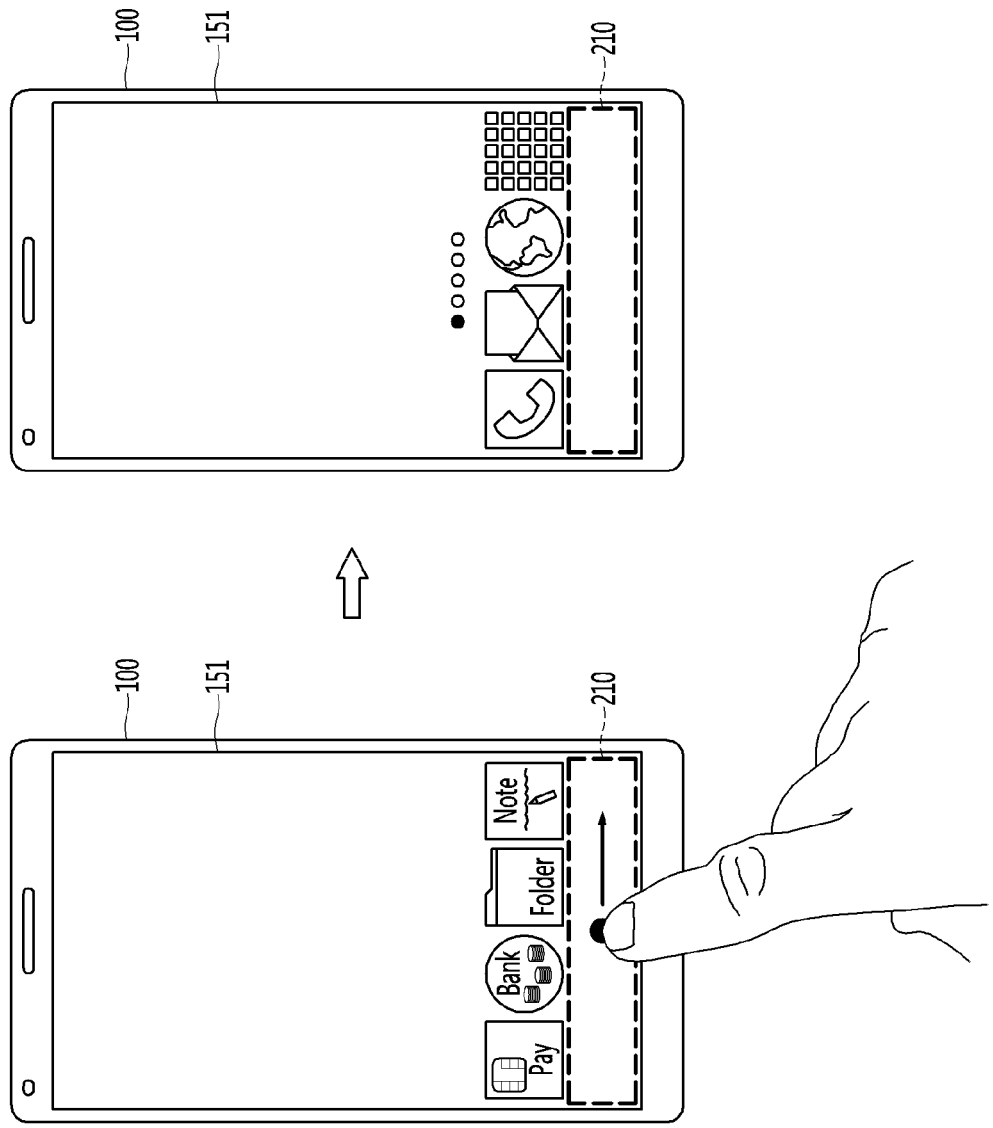

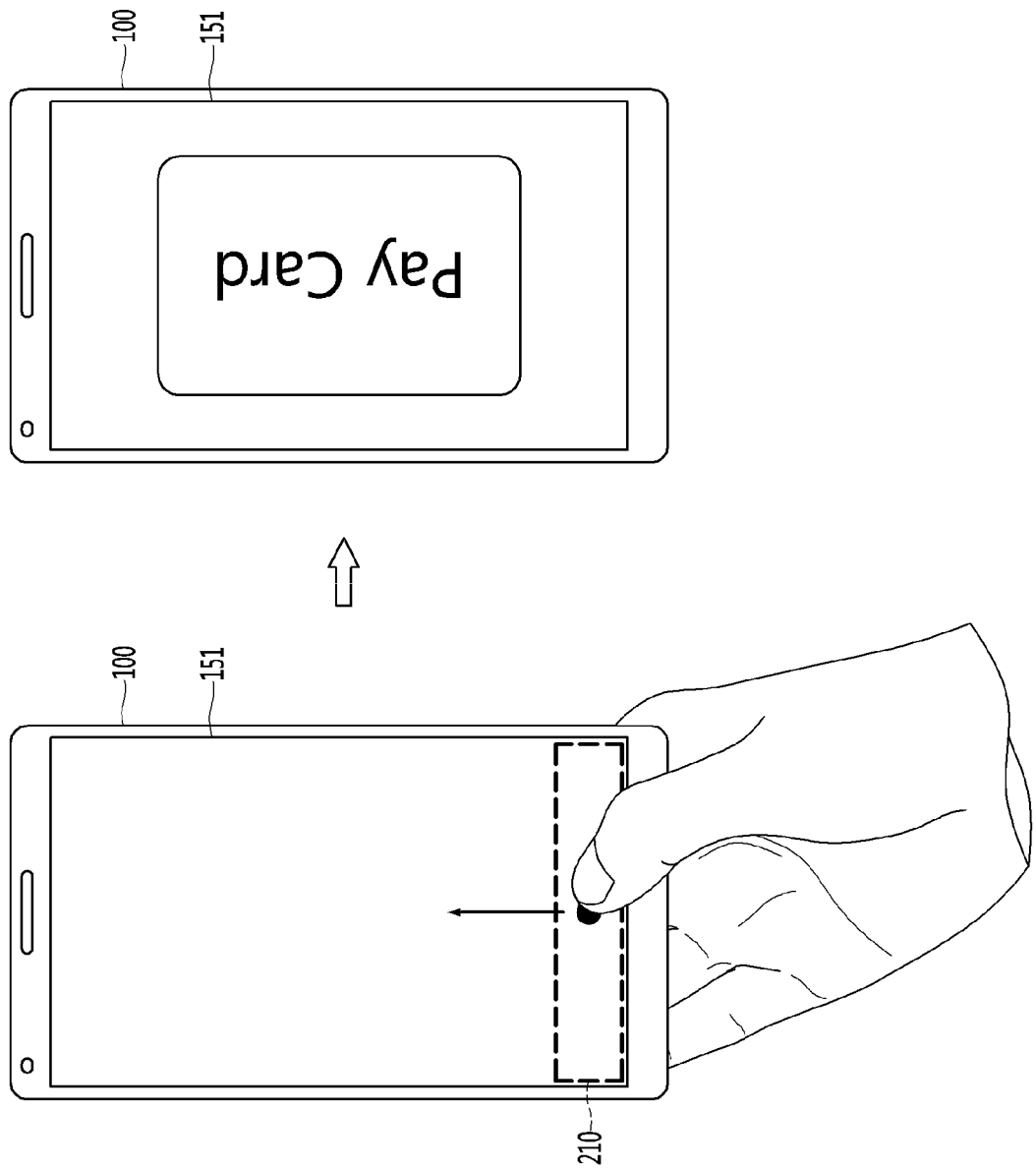

MOBILE TERMINAL AND OPERATING METHOD THEREFOR

CROSS REFERENCE TO RELATED APPLICATION

This application is the National Phase of PCT International Application No. PCT/KR2015/011497, filed on Oct. 29, 2015, all of which is hereby expressly incorporated by reference into the present application.

TECHNICAL FIELD

The present disclosure relates to a mobile terminal and a method of operating the same and, more particularly, to a mobile terminal capable of easily and conveniently performing fingerprint authentication to execute a security-enabled application or menu and, at the same time, enhancing the security of the mobile terminal, and a method of operating the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Further, the mobile terminal may perform a function for receiving a multicast signal for providing visual content such as a broadcast, video or a television program. Recently, functions requiring security and reliability, such as a payment function, have been added to the mobile terminal.

User authentication is required to perform a payment function on a mobile terminal. Various types of user authentication are possible, but a fingerprint authentication method may be effective due to the characteristics of the payment function requiring high reliability and security. To this end, a finger scan sensor capable of recognizing a fingerprint input by a user needs to be built in the mobile terminal.

Due to the manipulation pattern of the user, the finger scan sensor may be located at the lower end of a screen. In addition, interference occurs between touch keys such as a home key, a menu key, a back key, etc. disposed in a lower end area of the screen and the finger scan sensor.

Further, fingerprint authentication using the built-in finger scan sensor may be used to maintain security of applications or menus performed by the mobile terminal, in addition to user authentication. However, there is no method of implementing this.

Since the finger scan sensor is built in the mobile terminal, the user interface (UI) of an existing mobile terminal is influenced. Accordingly, a new UI needs to be provided in all aspects such as arrangement of applications and menus to be subjected to fingerprint authentication, the configuration of a main screen and a method of performing fingerprint authentication upon receiving user input.

DISCLOSURE

Technical Problem

An object of the present disclosure is to provide a mobile terminal capable of enhancing the security of the mobile terminal through fingerprint authentication, and easily and conveniently performing fingerprint authentication to execute a security-enabled application or menu, and a method of operating the same.

Another object of the present disclosure is to provide a new UI in all aspects such as arrangement of applications and menus to be subjected to fingerprint authentication, the configuration of a main screen and a method of performing fingerprint authentication upon receiving user input, when a finger scan sensor is built in a portion of a screen of a mobile terminal.

Technical Solution

According to an aspect of the present disclosure, a mobile terminal includes a display unit including a fingerprint recognizable area in which a fingerprint is recognizable and a fingerprint unrecognizable area in which the fingerprint is unrecognizable, a finger scan sensor built in a lower end of the display unit to correspond to the fingerprint recognizable area to recognize the fingerprint input to the display unit, and a controller for controlling the finger scan sensor to recognize the fingerprint input simultaneously with drag operation and executing a security home screen or a basic home screen depending on whether fingerprint authentication is successfully performed based on the fingerprint recognized by the finger scan sensor, when the drag operation of moving a finger from any one of the fingerprint recognizable area and the fingerprint unrecognizable area to the other area is input to the display unit in a state in which the finger is in contact.

According to another embodiment of the present disclosure, a method of operating a mobile terminal includes inputting drag operation of moving a finger from any one of a fingerprint recognizable area in which a fingerprint is recognizable and a fingerprint unrecognizable area in which the fingerprint is unrecognizable in a state in which the finger is in contact, recognizing the fingerprint input simultaneously with the drag operation, performing fingerprint authentication based on the recognized fingerprint, and executing a security home screen or a basic home screen depending on whether the fingerprint authentication is successful.

Advantageous Effects

According to at least one of the embodiments of the present disclosure, it is possible to provide a new UI in all aspects influenced by a finger scan sensor added to a mobile terminal, such as arrangement of applications and menus to be subjected to fingerprint authentication, execution of applications and menus through fingerprint authentication, the configuration of a main screen and a method of performing fingerprint authentication upon receiving user input.

DESCRIPTION OF DRAWINGS

FIGS. 3a and 3b are diagrams showing a screen displayed by a method of operating a mobile terminal according to one embodiment of the present disclosure.

FIGS. 4a and 4b are diagrams showing a screen displayed by a method of operating a mobile terminal according to one embodiment of the present disclosure.

FIGS. 7a and 7b are diagrams showing a screen displayed by a method of operating a mobile terminal according to one embodiment of the present disclosure.

FIG. 18 is a diagram showing a process of operating a mobile terminal according to one embodiment of the present disclosure.

FIGS. 19a and 19b are diagrams showing a screen displayed by a method of operating a mobile terminal according to one embodiment of the present disclosure.

FIGS. 20a and 20b are diagrams showing a screen displayed by a method of operating a mobile terminal according to one embodiment of the present disclosure.

FIG. 21 is a diagram showing a screen displayed by a method of operating a mobile terminal according to one embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1:
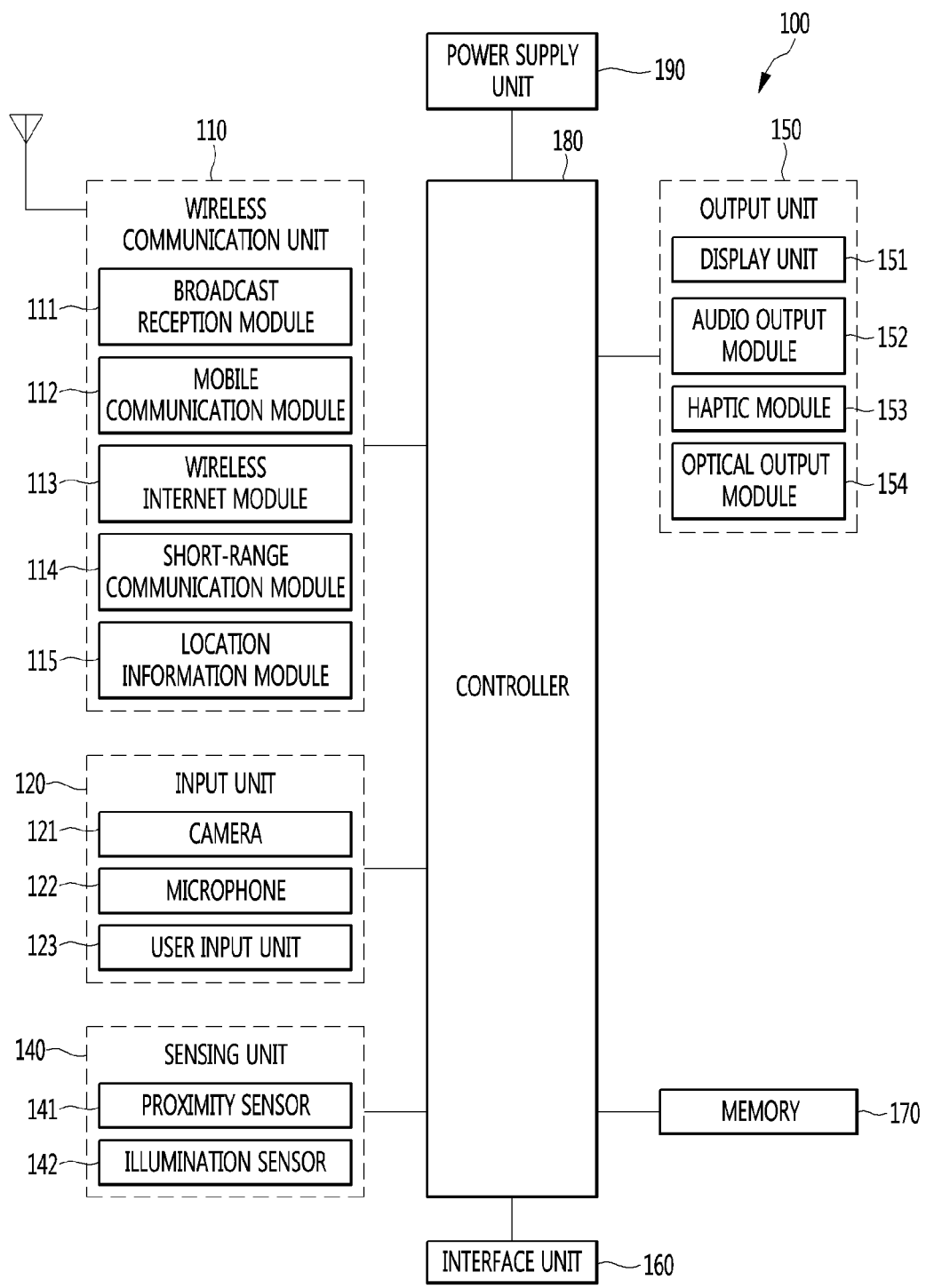
FIG. 1 is a block diagram of a mobile terminal in accordance with the present disclosure.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above-described components may operate in cooperation with each other to implement the operation, control or control method of the mobile terminal according to various embodiments described below. In addition, the operation, control, or control method of the mobile terminal may be implemented on the mobile terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 2:
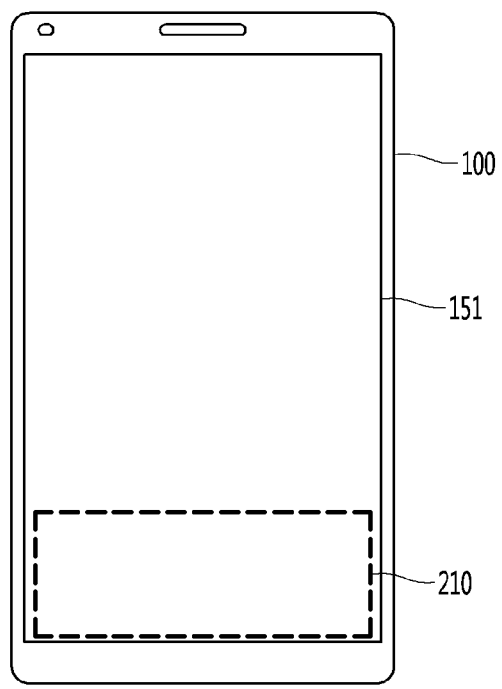
FIG. 2 is a diagram showing a fingerprint recognizable area of a mobile terminal according to one embodiment of the present disclosure.

FIG. 2 is a diagram showing a fingerprint recognizable area of a mobile terminal according to one embodiment of the present disclosure.

A finger scan sensor for recognizing a fingerprint may be built in the mobile terminal 100 according to one embodiment of the present disclosure. The finger scan sensor may be disposed in consideration of a manipulation pattern of a user. In one embodiment, the finger scan sensor may be located at the lower end of the screen of the mobile terminal 100.

The display unit 151 implemented by a touchscreen is disposed on the front surface of the mobile terminal 100 to recognize touch input of the user. The finger scan sensor may be built in a low layer of the display unit 151 to recognize the fingerprint of the user input to the display unit 151 when user touch input is received.

The area of the display unit 151 located in correspondence with the finger scan sensor may be an area in which the fingerprint is recognizable. Hereinafter, in the present disclosure, this is defined as a fingerprint recognizable area. The area of the display unit 151 excluding the fingerprint recognizable area is a fingerprint unrecognizable area (not shown). Referring to FIG. 2, the fingerprint recognizable area 210 is located at the lower end of the display unit 151 of the mobile terminal 100.

FIGS. 3a and 3b are diagrams showing a screen displayed by a method of operating a mobile terminal according to one embodiment of the present disclosure.

According to one embodiment of the present disclosure, when user input is received in a state in which the screen is turned off, a home screen may be differently configured and displayed depending on whether user input is received in the fingerprint recognizable area. Specifically, when user input is received in an area excluding the fingerprint recognizable area, a basic home screen may be displayed and, when user input is received in the fingerprint recognizable area, a security home screen may be displayed.

The basic home screen may be defined as a main screen first displayed when the screen of the mobile terminal 100 is turned on or is unlocked. Icons such as all applications (hereinafter referred to as apps), menus, functions and content executed on the mobile terminal 100 may be displayed on the basic home screen.

The security home screen may be defined as a main screen first displayed when fingerprint authentication in the fingerprint recognizable area is successful. Icons such as security-enabled apps, menus, functions and content may be displayed on the security home screen. The user should perform user authentication to execute the security-enabled apps, menus, functions and content. Here, the security-enabled app is distinguished from a security app meaning a vaccine program for curing a PC virus. In the present disclosure, the security-enabled app is defined as an app which is locked by a user or an app requiring user authentication for execution of or access to the app. Such definition is equally applicable to the menu, the function and the content and thus a security-enabled menu, a security-enabled function and security-enabled content may be similarly defined.

Since the fingerprint of the user was input in the fingerprint recognizable area in order to enter the security home screen and user authentication has already been performed, the app, menu, function and content displayed on the security home screen may be executed on the security home screen without additional user authentication.

The user should be able to recognize the location of the fingerprint recognizable area. To this end, when user input of dragging a finger to the fingerprint recognizable area is received, the mobile terminal 100 may generate a haptic effect and a feedback graphic user interface (GUI) effect. For example, when user input of entering the fingerprint recognizable area is received, a haptic effect for vibrating the screen or a feedback GUI effect for displaying a wavy pattern on the screen may be generated. Alternatively, the fingerprint recognizable area may be changed and displayed in an identifiable form. For example, the boundary of the fingerprint recognizable area may be indicated in the form of a dotted line or the fingerprint recognizable area may be displayed in a blinking manner.

The user input may be drag operation. In this case, the mobile terminal 100 displays the basic home screen when operation of dragging the finger not to reach the fingerprint recognizable area is input and displays the security home screen when operation of dragging the finger to the fingerprint recognizable area is input. However, the user input is not limited to the drag operation and various operations such as touch operation, force touch operation and haptic touch operation may be set as long as a fingerprint can be input.

In FIG. 3a, the user drags a finger not to reach the fingerprint recognizable area in a state the screen is turned off. As long as the finger does not reach the fingerprint recognizable area, the drag operation may be performed in any direction. That is, the user may drag the finger in the opposite direction Y of the fingerprint recognizable area, in a direction X inclined from the opposite direction by 45 degrees or a direction Z parallel to the fingerprint recognizable area.

When such drag operation is input, the mobile terminal 100 displays the basic home screen on the display unit 151. Specifically, an app icon shown in FIG. 3a may be displayed on the basic home screen and icons such as other apps, menus, functions and content may be displayed as the page of the basic home screen is scrolled from side to side. Meanwhile, although security-enabled apps, menus, functions and content displayed on the security home screen may be displayed on the basic home screen, security-enabled apps, menus, functions and content may not be executed or accessed on the basic home screen.

In FIG. 3b, the user drags the finger to the fingerprint recognizable area in a state in which the screen is turned off. If the user drags the finger in a fingerprint recognizable area direction a, the fingerprint pattern of the finger is input in the fingerprint recognizable area when the finger enters the fingerprint recognizable area. When the fingerprint pattern of the finger is completely input to be recognized, the input fingerprint pattern may be recognized in the fingerprint recognizable area.

When user authentication is successful based on the input fingerprint pattern, the mobile terminal 100 displays the security home screen on the display unit 151. A watermark may be displayed on the security home screen or a GUI effect may be generated, such that the user can recognize that the security home screen is displayed. Alternatively, the security home screen may be configured with a GUI theme different from that of the basic home screen. Referring to FIG. 3b, a payment app icon, a bank app icon, a secret folder icon and a note app icon are displayed at the lower end of the security home screen. In this case, since fingerprint authentication has already been performed in the process of entering the security home screen, the user may execute the apps on the security home screen without user authentication.

FIGS. 4a and 4b are diagrams showing a screen displayed by a method of operating a mobile terminal according to one embodiment of the present disclosure.

According to one embodiment of the present disclosure, when user input is received in a state in which the screen is locked, the home screen may be differently configured and displayed depending on whether user input is received in the fingerprint recognizable area. Specifically, when user input is received in an area excluding the fingerprint recognizable area, the basic home screen may be displayed and, when user input is received in the fingerprint recognizable area, the security home screen may be displayed.

FIGS. 4a and 4b are equal to FIGS. 3a and 3b except that user input is received in a state in which the screen is locked. Accordingly, a description overlapping with FIGS. 3a and 3b will be omitted.

In FIG. 4a, the user drags the finger not to reach the fingerprint recognizable area in a state in which the screen is locked. Specifically, the user may drag the finger in the opposite direction Y of the fingerprint recognizable area, in a direction X inclined from the opposite direction by 45 degrees or a direction Z parallel to the fingerprint recognizable area.

When such drag operation is input, the basic home screen including app icons is displayed as shown at the right side of FIG. 4a. In this case, although the security-enabled app, menu, function and content are displayed on the basic home screen, the security-enabled app, menu, function and content may not be executed or accessed on the basic home screen.

In FIG. 4b, the user drags the finger to the fingerprint recognizable area in a state in which the screen is locked. If the user drags the finger in the fingerprint recognizable area direction a, the fingerprint pattern of the finger is input in the fingerprint recognizable area when the finger enters the fingerprint recognizable area. When the fingerprint pattern of the finger is completely input to be recognized, the input fingerprint pattern may be recognized in the fingerprint recognizable area.

When user authentication is successful based on the input fingerprint pattern, the mobile terminal 100 displays a payment app icon, a bank app icon, a secret folder icon and a note app icon at the lower end of the security home screen as shown at the right side of FIG. 4b. In this case, since fingerprint authentication has already been performed in the process of entering the security home screen, the user may execute the apps on the security home screen without user authentication.

Figure 5:
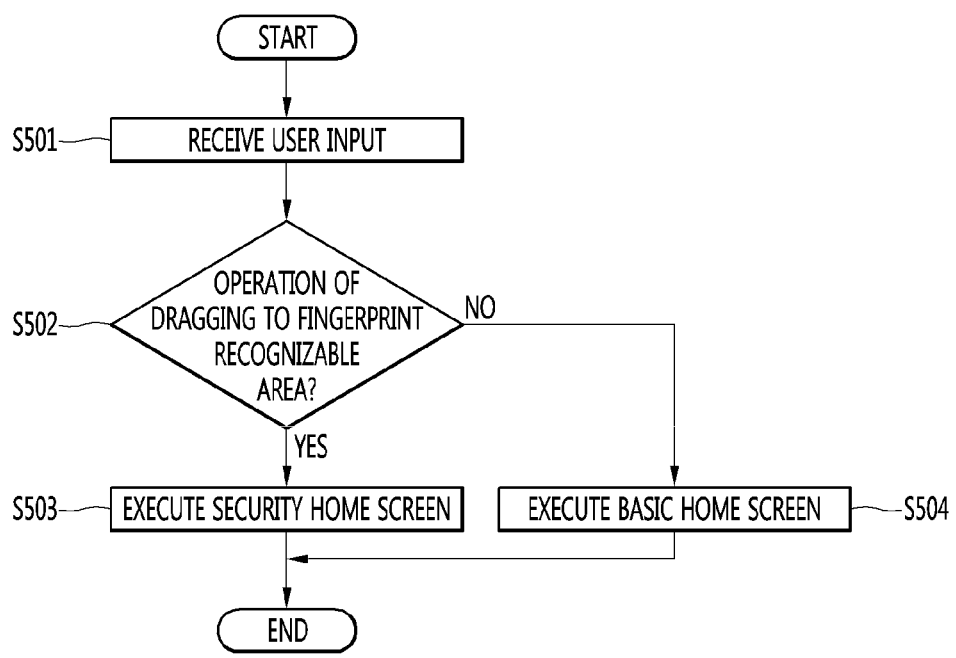
FIG. 5 is a diagram showing a process of operating a mobile terminal according to one embodiment of the present disclosure.

FIG. 5 is a diagram showing a process of operating a mobile terminal according to one embodiment of the present disclosure.

FIG. 5 will be described by referring to FIGS. 3a to 4b.

The mobile terminal 100 receives user input from the user (S501).

The user input may be operation of dragging the finger of the user on the screen of the mobile terminal 100. In this case, the screen of the mobile terminal 100 may be in an off state or a locked state.

The mobile terminal 100 determines whether the received user input is operation of dragging the finger to the fingerprint recognizable area (S502).

The mobile terminal 100 may display the basic home screen or the security home screen depending on whether user input is received in the fingerprint recognizable area. Specifically, when user input of dragging the finger not to reach the fingerprint recognizable area is received, the basic home screen may be displayed and, when user input of dragging the finger to the fingerprint recognizable area is received, the security home screen may be displayed. Upon determining that operation of dragging the finger to the fingerprint recognizable area is received in step S502 (S502—Yes), the mobile terminal 100 may display the security home screen (S503). In contrast, upon determining that operation of dragging the finger to the fingerprint recognizable area is not received (S502—No), the mobile terminal 100 displays the basic home screen (S504).

Security-enabled apps and general apps which can be executed without user authentication may be displayed on an existing home screen. Accordingly, when the screen is unlocked, an unauthorized third party can access a security-enabled app (although user authentication fails later).

However, according to the present embodiment, it is impossible to access or execute a security-enabled app on the basic home screen. Accordingly, it is possible to enhance security of the security-enabled app.

According to the present embodiment, if operation of dragging the finger to the fingerprint recognizable area is received, the security home screen is displayed. In this process, since the fingerprint is input in the fingerprint recognizable area to perform user authentication, the app, menu, function and content displayed on the security home screen may be executed on the security home screen without additional user authentication. Therefore, the user can conveniently execute the security-enabled app, thereby increasing user convenience.

Figure 6:
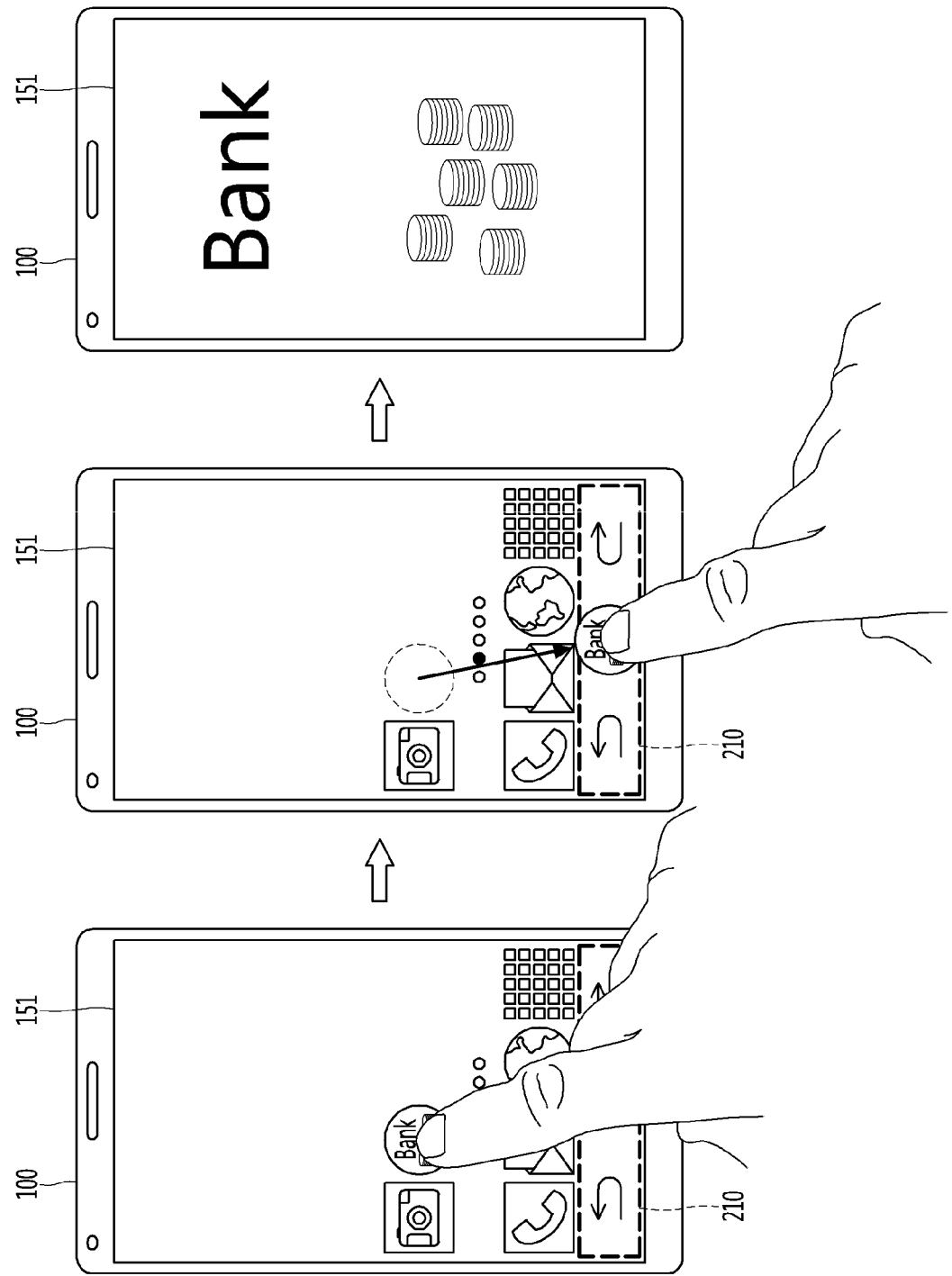
FIG. 6 is a diagram showing a screen displayed by a method of operating a mobile terminal according to one embodiment of the present disclosure.

FIG. 6 is a diagram showing a screen displayed by a method of operating a mobile terminal according to one embodiment of the present disclosure.

According to one embodiment of the present disclosure, by dragging a security-enabled app to a fingerprint recognizable area 210, user authentication may be performed and thus the security-enabled app may be executed. Specifically, when the user drags the security-enabled app to the fingerprint recognizable area 210 using the finger, the security-enabled app and the finger for dragging the security-enabled app may simultaneously enter the fingerprint recognizable area 210. In this case, the fingerprint pattern of the finger may be input in the fingerprint recognizable area 210. When the fingerprint pattern of the finger is completely input to be recognized, the input fingerprint pattern may be recognized in the fingerprint recognizable area 210.

When the fingerprint pattern is recognized in the fingerprint recognizable area 210 and user authentication is successful, the security-enabled app dragged to the fingerprint recognizable area 210 may be executed. Meanwhile, if the drag operation is finished, the security-enabled app dragged to the fingerprint recognizable area 210 is returned to an original place.

In FIG. 6, the basic home screen is displayed on the display unit 151 of the mobile terminal 100. Icons such as a telephone icon, a text message icon, an Internet icon, an application menu icon, a camera icon and a bank app icon are displayed on the basic home screen. Touch keys such as a forward key, a home key and a backward key are displayed at the lower end of the basic home screen and the fingerprint recognizable area 210 overlaps the touch keys. Meanwhile, in order for the user to recognize the location of the fingerprint recognizable area 210, the mobile terminal 100 may generate a haptic effect and a feedback GUI effect or change and display the fingerprint recognizable area 210 in an identifiable form when operation of dragging to the fingerprint recognizable area 210 is received.

When the user drags a bank app to the fingerprint recognizable area 210 using the finger, user authentication for the bank app may be performed. When the fingerprint pattern of the dragged finger is completely input in the fingerprint recognizable area 210, the input fingerprint pattern is recognized in the fingerprint recognizable area 210 and user authentication is performed based on the input fingerprint pattern.

When user authentication is successful based on the input fingerprint pattern, the mobile terminal 100 executes the bank app. Meanwhile, when the drag operation is finished, the bank app icon dragged to the fingerprint recognizable area 210 is returned to an original location.

Meanwhile, the present embodiment is equally applicable to a security-enabled folder, widget and content in addition to the security-enabled app shown in FIG. 6. For example, when the security-enabled folder or widget is dragged to the fingerprint recognizable area 210, fingerprint authentication may be performed simultaneously with drag operation, thereby immediately executing the security-enabled folder or widget. In addition, when the security-enabled content, that is, pictures, videos, music and documents, is dragged to the fingerprint recognizable area 210, fingerprint authentication is performed and the security-enabled content is immediately executed or displayed.

In the past, in order to execute the security-enabled app, the user had to enter the security-enabled app and to perform a user authentication procedure required by the app. Further, if the user authentication procedure includes complicated steps for reliability of user authentication, the user had to perform a cumbersome authentication procedure having various steps.

According to the present embodiment, user authentication may be performed simultaneously with operation of dragging the security-enabled app to the fingerprint recognizable area and. That is, the security-enabled app may be executed by dragging the security-enabled app to the fingerprint recognizable area. Therefore, it is possible to easily and conveniently execute the security-enabled app without additional user authentication. Further, by defining new operation of executing the app in a UI, it is possible to provide new user experience to the user.

FIGS. 7*a* and 7*b* are diagrams showing a screen displayed by a method of operating a mobile terminal according to one embodiment of the present disclosure.

According to one embodiment of the present disclosure, the mobile terminal 100 may display a security-enabled function in the fingerprint recognizable area 210, and perform fingerprint authentication simultaneously with user input when user input of selecting the security-enabled function is received, thereby executing the security-enabled function.

The security-enabled function may be provided to the user in the form of an overflow menu. The overflow menu is a menu displayed to be moved from the lower side of the screen upward. When the user selects a menu key located at the lower end of the screen, the overflow menu including the security-enabled function is displayed. The overflow menu may include various functions performed by the mobile terminal 100 in addition to the security-enabled function. In order to perform fingerprint authentication simultaneously with selection of the user, the security-enabled function may be disposed in an area corresponding to the fingerprint recognizable area 210 in an area in which the overflow menu is displayed.

The overflow menu 710 displayed when the user selects a menu key (not shown) is shown in FIG. 7*a*. The overflow menu 710 includes a home screen setting function, an app and widget addition function, a security screen setting function and a secret folder function. The security screen setting function and the secret folder function may correspond to the security-enabled function.

The security screen setting function and the secret folder function may be disposed at a location corresponding to the fingerprint recognizable area 210 on the overflow menu 710. Accordingly, when the user selects the security screen setting function or the secret folder function, fingerprint authentication may be performed simultaneously with selection of the user. As shown in FIG. 7*a*, when the user touches and selects the secret folder function, the fingerprint pattern of the touched finger is input in the fingerprint recognizable area 210 at a touch time, fingerprint authentication is performed in the fingerprint recognizable area 210 based on the input fingerprint pattern. When fingerprint authentication is successful, the secret folder function is executed and the execution screen of the secret folder is displayed on the display unit 151 of the mobile terminal 100.

Unlike FIG. 7*a*, the security-enabled function may be disposed at a location corresponding to the fingerprint recognizable area 210 on the overflow menu 710 by manipulation of the user. FIG. 7*b* shows such a process. When the user selects a menu key (not shown), the overflow menu 710 including the home screen setting function, the security screen setting function, the secret folder function and the app and widget addition function is displayed on the screen. As already described in FIG. 7*a*, the security screen setting function and the secret folder function are included in the security-enabled function.

The locations of the functions included in the overflow menu 710 may be changed by drag operation or scroll operation of the user. For example, the user may select a specific function and then drag or move the specific function to a desired location or scroll the overflow menu 710 downward or upward, thereby changing the location of the specific function displayed on the overflow menu 710.

Therefore, the user may dispose the security-enabled function on the overflow menu 710 at the location corresponding to the fingerprint recognizable area 210. When the security-enabled function is disposed in the fingerprint recognizable area 210, the user may perform fingerprint authentication simultaneously with touching and selection of the security-enabled function.

As shown in FIG. 7b, the user scrolls the overflow menu 710 downward to locate the secret folder function in the fingerprint recognizable area 210. As the secret folder function is moved downward, the app and widget addition function located at the lowermost end of the overflow menu 710 is moved to the uppermost end of the overflow menu 710.

When the user touches and selects the secret folder function located in the fingerprint recognizable area 210, the fingerprint pattern of the touched finger is input in the fingerprint recognizable area 210 at a touch time, and fingerprint authentication is performed in the fingerprint recognizable area 210 based on the input fingerprint pattern. When fingerprint authentication is successful, the secret folder function is executed and the execution screen of the secret folder is displayed on the display unit 151 of the mobile terminal 100.

Figure 8:
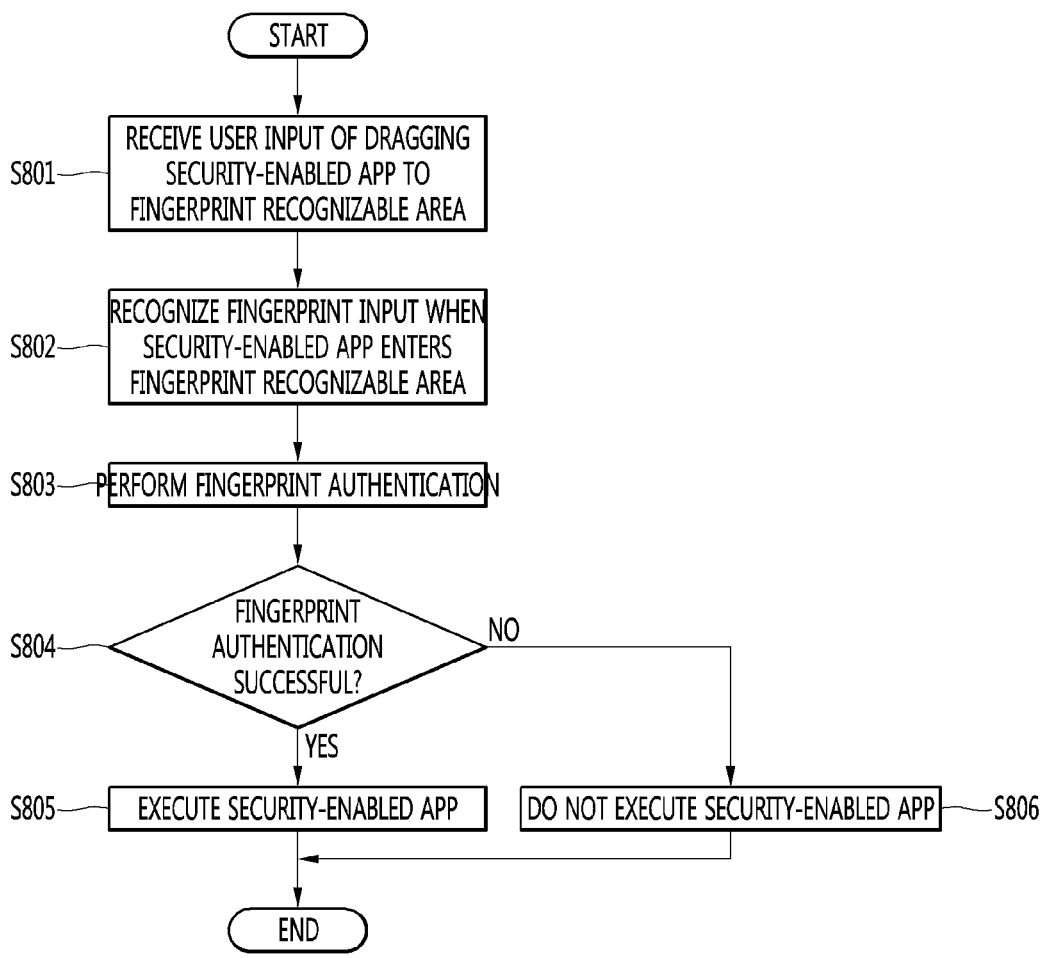
FIG. 8 is a diagram showing a process of operating a mobile terminal according to one embodiment of the present disclosure.

FIG. 8 is a diagram showing a process of operating a mobile terminal according to one embodiment of the present disclosure.

FIG. 8 will be described by referring to FIG. 6.

The mobile terminal 100 receives user input of dragging the security-enabled app to the fingerprint recognizable area (S801).

The drag operation may be operation of moving a finger from one point to another point on the screen while keeping the finger in contact with the screen and then taking off the finger. Accordingly, the user input may be operation of moving a finger to the fingerprint recognizable area while keeping the finger in contact with the security-enabled app and then taking off the finger. Meanwhile, the screen of the mobile terminal 100 may be in a state of entering the basic home screen.

The mobile terminal 100 recognizes the fingerprint when the security-enabled app enters the fingerprint recognizable area (S802).

When the security-enabled app is dragged to enter the fingerprint recognizable area, the finger for dragging the security-enabled app also enters the fingerprint recognizable area, such that the fingerprint pattern of the finger is input in the fingerprint recognizable area. When fingerprint pattern of the finger is completely input to be recognized, the input fingerprint pattern may be recognized in the fingerprint recognizable area.

When the fingerprint pattern is recognized, the mobile terminal 100 performs fingerprint authentication (S803).

Specifically, the mobile terminal 100 may determine whether the recognized fingerprint pattern matches a fingerprint pattern registered by the user.

The mobile terminal 100 determines whether fingerprint authentication is successful (S804).

Upon determining that the recognized fingerprint pattern matches the fingerprint pattern registered by the user and fingerprint authentication is successful in step S804 (S804—Yes), the mobile terminal 100 executes the security-enabled app (S805).

In contrast, upon determining that the recognized fingerprint pattern does not match the fingerprint pattern registered by the user and fingerprint authentication fails in step S804 (S804—No), the mobile terminal 100 does not execute the security-enabled app (S806).

In the past, user authentication was performed in order to execute the security-enabled app on the home screen.

However, according to the present embodiment, fingerprint authentication is performed at the same time as dragging the security-enabled app to the fingerprint recognizable area. Accordingly, it is possible to easily execute the security-enabled app by performing only operation of dragging the security-enabled app.

Figure 9:
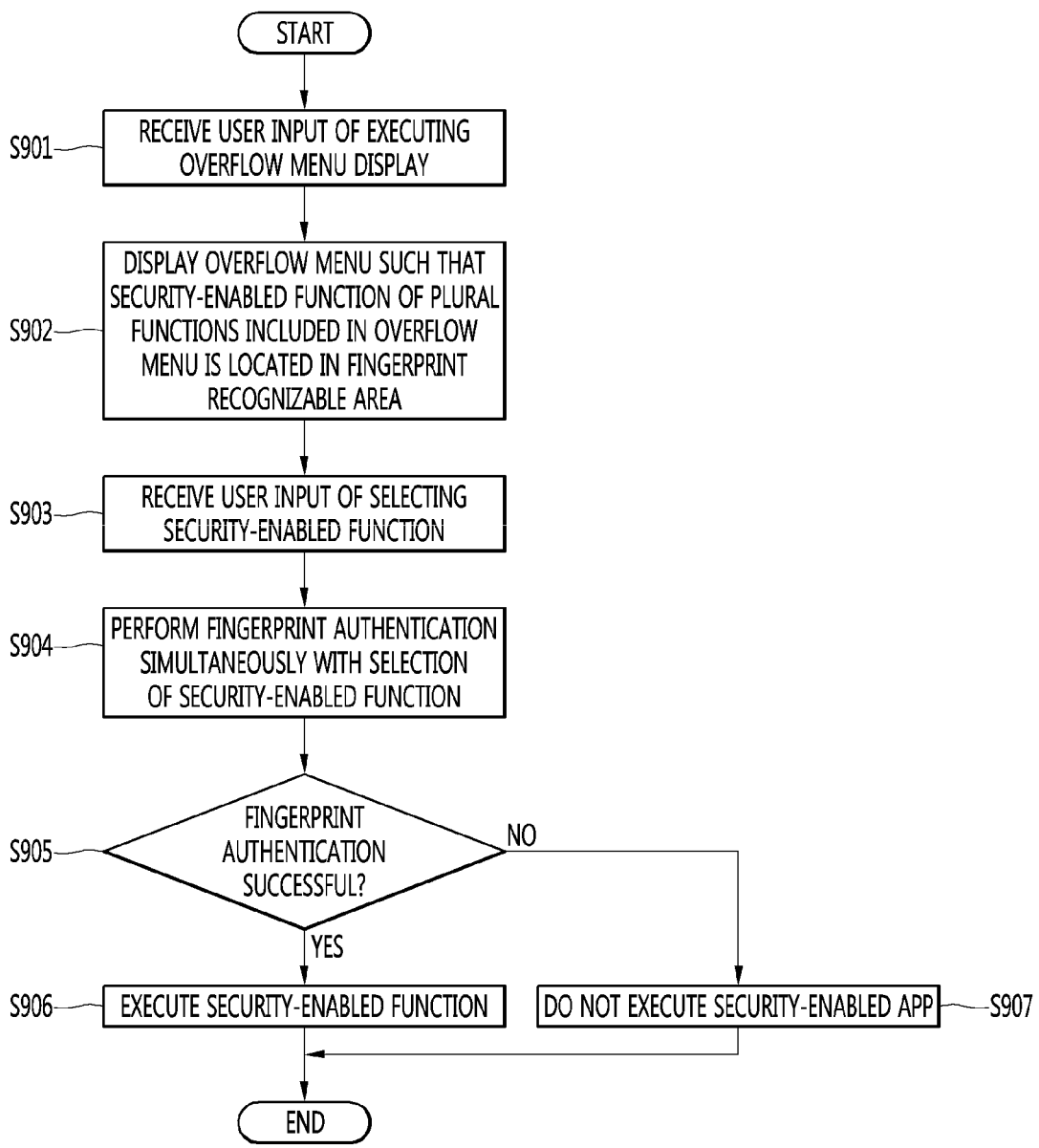
FIG. 9 is a diagram showing a process of operating a mobile terminal according to one embodiment of the present disclosure.

FIG. 9 is a diagram showing a process of operating a mobile terminal according to one embodiment of the present disclosure.

FIG. 9 will be described by referring to FIG. 7a.

The mobile terminal 100 receives user input of displaying the overflow menu (S901).

The user input may be operation of touching, force touching, haptic touching or dragging and selecting a menu key located at a lower end of the screen.

The mobile terminal 100 displays the overflow menu such that the security-enabled function of the plurality of functions included in the overflow menu is located in the fingerprint recognizable area (S902).

The overflow menu may include various functions or menus performed by the mobile terminal 100, in addition to the security-enabled function. In this case, the security-enabled function may be disposed in an area corresponding to the fingerprint recognizable area of the area in which the overflow menu is displayed so as to perform fingerprint authentication simultaneously with selection of the user. The overflow menu may be displayed to be moved from the lower side of the screen upward.

The mobile terminal 100 receives user input of selecting the security-enabled function (S903).

The user input may be user's operation of touching and selecting the security-enabled function located in the fingerprint recognizable area. However, the user input is not limited to touch operation and various operations for recognizing the fingerprint of the user, such as force touch operation, long touch operation and drag operation, may be set.

The mobile terminal 100 performs fingerprint authentication simultaneously with selection of the security-enabled function (S904).

Specifically, when the user touches and selects the security-enabled function, the fingerprint pattern of the touched finger may be input in the fingerprint recognizable area at a touch time, and fingerprint authentication may be performed in the fingerprint recognizable area based on the input fingerprint pattern.

The mobile terminal 100 determines whether fingerprint authentication is successful (S905).

If fingerprint authentication is successful in the fingerprint recognizable area, the security-enabled function is executed.

Upon determining that the recognized fingerprint pattern matches the fingerprint pattern registered by the user and fingerprint authentication is successful in step S905 (S905—Yes), the mobile terminal 100 executes the security-enabled function (S906). In contrast, upon determining that the recognized fingerprint pattern does not match the fingerprint pattern registered by the user and fingerprint authentication fails (S905—No), the mobile terminal 100 does not execute the security-enabled function (S907).

According to the present embodiment, if the security-enabled function is provided as the overflow menu in the fingerprint recognizable area and the user touches and selects the security-enabled function, fingerprint authentication is performed simultaneously with touch of the user, thereby executing the security-enabled function. That is, fingerprint authentication is performed simultaneously with selection of the security-enabled function, thereby immediately executing the security-enabled function without user authentication. Therefore, a new convenient user interface (UI) is provided to the user.

The present embodiment is not limited to the security-enabled function and is similarly applicable to the security-enabled app, menu and content.

Figure 10A:
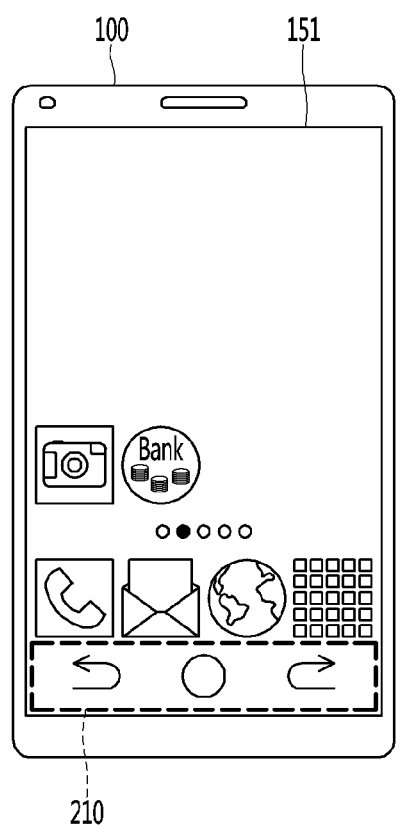
FIGS. 10a and 10b are diagrams showing a screen displayed by a method of operating a mobile terminal according to one embodiment of the present disclosure.
Figure 10B:
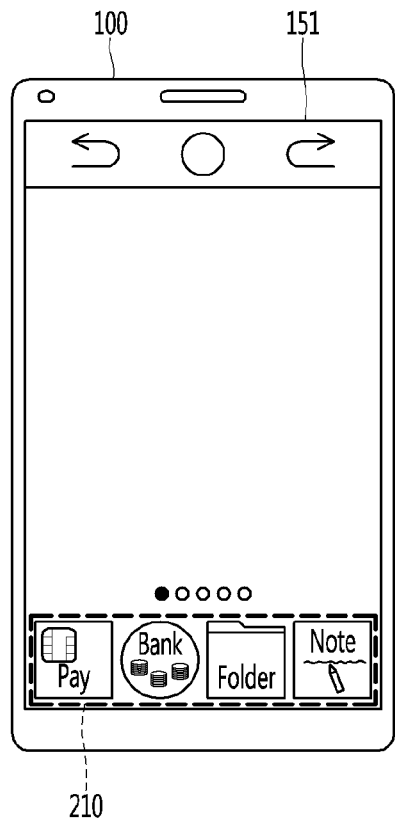

FIGS. 10a and 10b are diagrams showing a screen displayed by a method of operating a mobile terminal according to one embodiment of the present disclosure.

According to one embodiment of the present disclosure, the location of an app displayed on the screen may be differently configured and displayed according to the type of the home screen. Specifically, apps may be displayed in the entire area of the screen in the basic home screen and apps may be displayed in the fingerprint recognizable area in the security home screen. In this case, the basic home screen may display all apps, menus, functions and content executed in the mobile terminal 100, including the security-enabled app. On the security home screen, the security-enabled app may be displayed and an app in which security is not set or an app which does not require user authentication may not be displayed.

On the security home screen, since the security-enabled app is displayed in the fingerprint recognizable area, when user input of touching and selecting the security-enabled app is received, fingerprint authentication may be performed simultaneously with selection of the security-enabled app. In this case, the security-enabled app is executed without user authentication.

FIG. 10a shows a basic home screen. On the basic home screen, a telephone icon, a text message icon, an Internet icon, an application menu icon, a camera icon and a bank app icon are displayed. Touch keys such as a forward icon, a home icon and a back icon are displayed at the lower end of the basic home screen and the fingerprint recognizable area 210 is located to overlap the touch keys.

In this case, no app is located in the fingerprint recognizable area 210. Accordingly, the user cannot perform fingerprint authentication simultaneously with selection of an app on the basic home screen. Fingerprint authentication may be performed simultaneously with input of the touch key located in the fingerprint recognizable area 210.

FIG. 10b shows a security home screen. A payment app icon, a bank app icon, a secret folder icon and a note app icon are displayed at the lower end of the security home screen and the fingerprint recognizable area 210 is located to overlap the above-described app icons.

The payment app icon, the bank app icon, the secret folder icon and the note app icon are located in the fingerprint recognizable area 210. Accordingly, the user may perform fingerprint authentication simultaneously with selection of the app icon. Therefore, the user may execute the security-enabled app on the security home screen without user authentication.

Although the security-enabled app is described as being applied in FIGS. 10a and 10b, the present embodiment is equally applicable to the security-enabled folder, widget and content.

Figure 11:
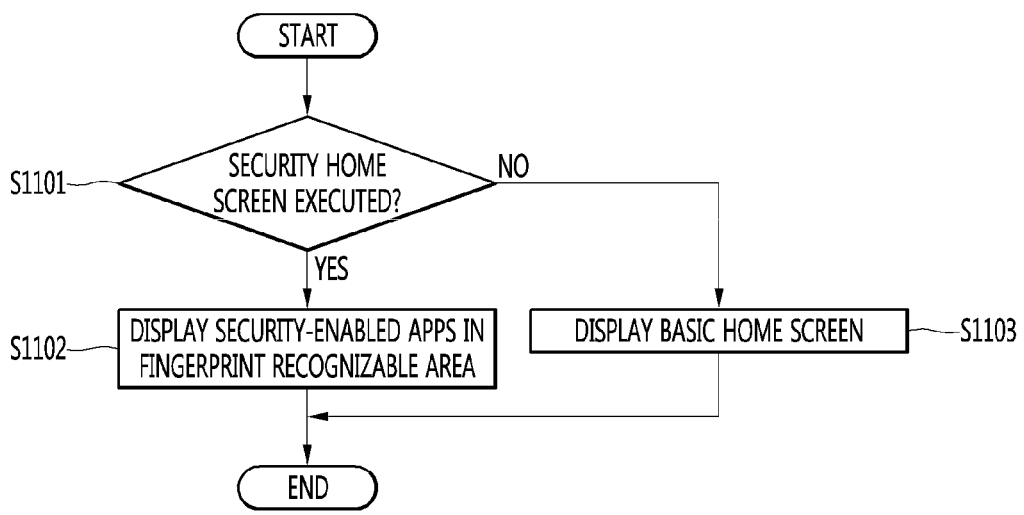
FIG. 11 is a diagram showing a process of operating a mobile terminal according to one embodiment of the present disclosure.

FIG. 11 is a diagram showing a process of operating a mobile terminal according to one embodiment of the present disclosure.

FIG. 11 will be described by referring to FIGS. 10a and 10b.

The mobile terminal 100 determines whether the security home screen is executed (S1101).

Specifically, the mobile terminal 100 may enter the security home screen if user input of selecting the security home screen is received.

The user input of selecting the security home screen may or may not involve user authentication performed through fingerprint input.

If the user input involves user authentication performed through fingerprint input, the user input may be, for example, operation of dragging to the fingerprint recognizable area as described in FIG. 3b. In this case, in order to execute the security-enabled app, user authentication may be performed twice in the process of selecting the security home screen and the process of selecting the security-enabled app, thereby enhancing security.

In contrast, if the user input does not involve user input performed through fingerprint input, the user input may be, for example, operation of touching a menu key which is not located in the fingerprint recognizable area. In this case, in order to execute the security-enabled app, the user performs user authentication only once in the process of selecting the security-enabled app.

In step S1101, upon determining that the security home screen is executed (S1101—Yes), the mobile terminal 100 displays the security home screen and, on the security home screen, the security-enabled apps are displayed in the fingerprint recognizable area (S1102). In this case, the user may execute the security-enable app by only performing operation of the security-enabled app icon displayed in the fingerprint recognizable area.

In contrast, upon determining that the security home screen is not executed (S1101—No), the mobile terminal 100 displays the basic home screen (S1103).

According to the present embodiment, the basic home screen and the security home screen may have different apps disposed thereon. On the security home screen, the security-enabled app may be disposed in an area corresponding to the fingerprint recognizable area. Therefore, when the user touches and selects the security-enabled app on the security home screen, fingerprint authentication may be performed simultaneously with selection of the user.

Figure 12:
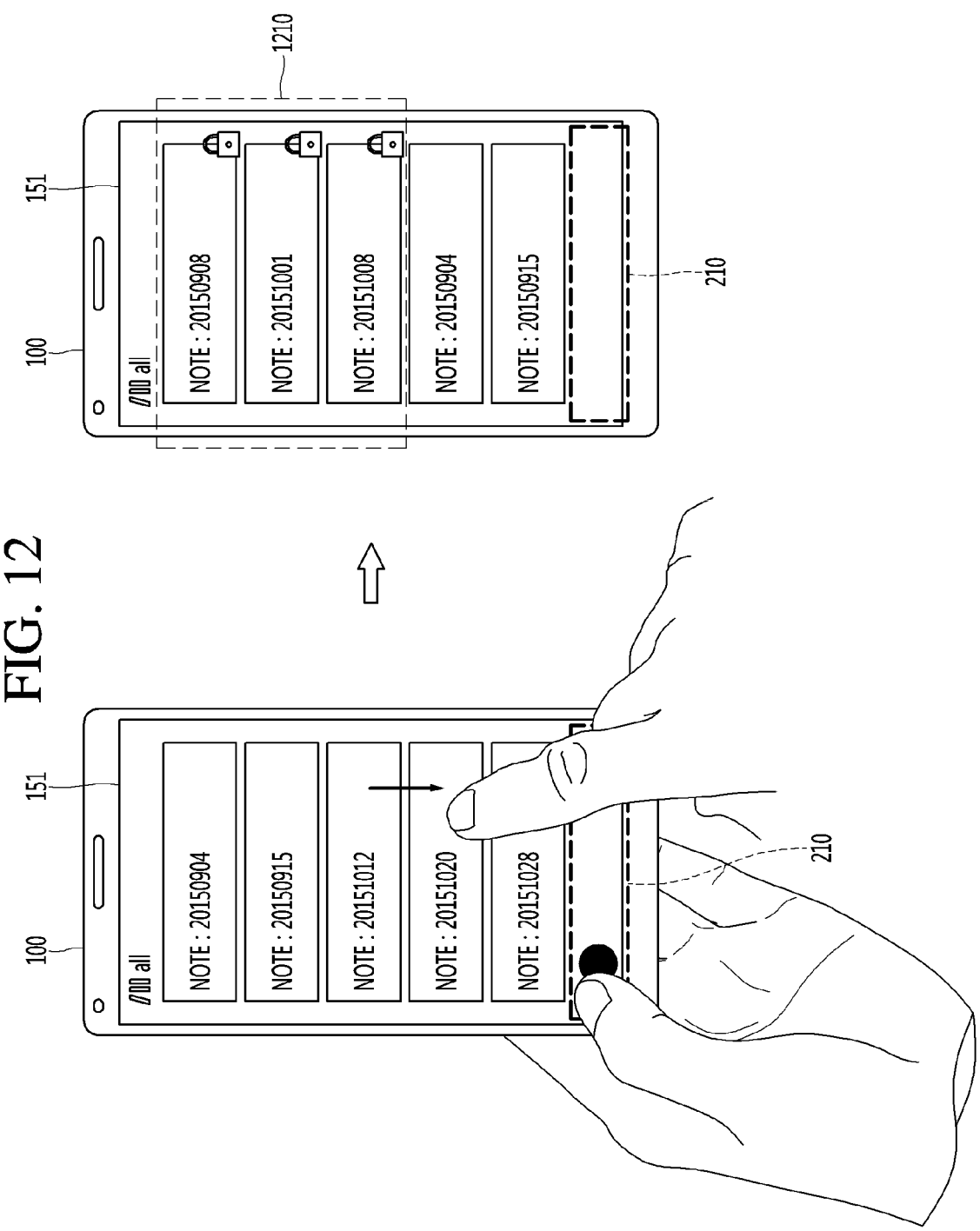
FIG. 12 is a diagram showing a screen displayed by a method of operating a mobile terminal according to one embodiment of the present disclosure.

FIG. 12 is a diagram showing a screen displayed by a method of operating a mobile terminal according to one embodiment of the present disclosure.

According to one embodiment of the present disclosure, if second input is received in a state in which user authentication is performed by first input received in the fingerprint recognizable area 210, security-enabled content may be displayed. Specifically, in a state in which the user performs authentication by touching the fingerprint recognizable area 210 with a finger, when the screen is scrolled with another finger upward or downward, the security-enabled content may be displayed to the user on the screen.

To this end, the mobile terminal 100 may perform a multi-touch function for recognizing a plurality of touches simultaneously input at a plurality of points.

The first input may be any type of user operation of inputting the fingerprint of the user, such as force touch operation and drag operation, in addition to the touch operation shown in FIG. 12. The second input may include various operations such as general touch operation, force touch operation, haptic touch operation and drag operations.

In FIG. 12, the user is executing a note app. When the note app is executed, a list of notes created by the user is aligned and displayed on the screen. However, in this case, security-enabled content, that is, locked notes, is not displayed on the screen.

In this case, as shown at the left side of FIG. 12, the user scrolls the screen downward with a right index finger in a state of putting a left thumb in the fingerprint recognizable area 210.

When the user touches the fingerprint recognizable area 210 with the left thumb, the fingerprint pattern of the left thumb is input upon touch, thereby performing fingerprint authentication. When the screen is scrolled with another finger in a state of performing fingerprint authentication, security-enabled content 1210 may be displayed as shown at the right side of FIG. 12.

The present embodiment is applicable to various types of apps. If the present embodiment is applied to a chatting app and the above-described user input is received, a list of secret contacts or secret dialog windows may be displayed to the user on the screen.

The present embodiment is applicable to the security-enabled function and menu in addition to the security-enabled content. For example, in a state in which the user performs authentication by touching the fingerprint recognizable area with a finger, when the screen is scrolled with another finger upward or downward, a hidden security-enabled function and menu may be displayed to the user on the screen.

Figure 13:
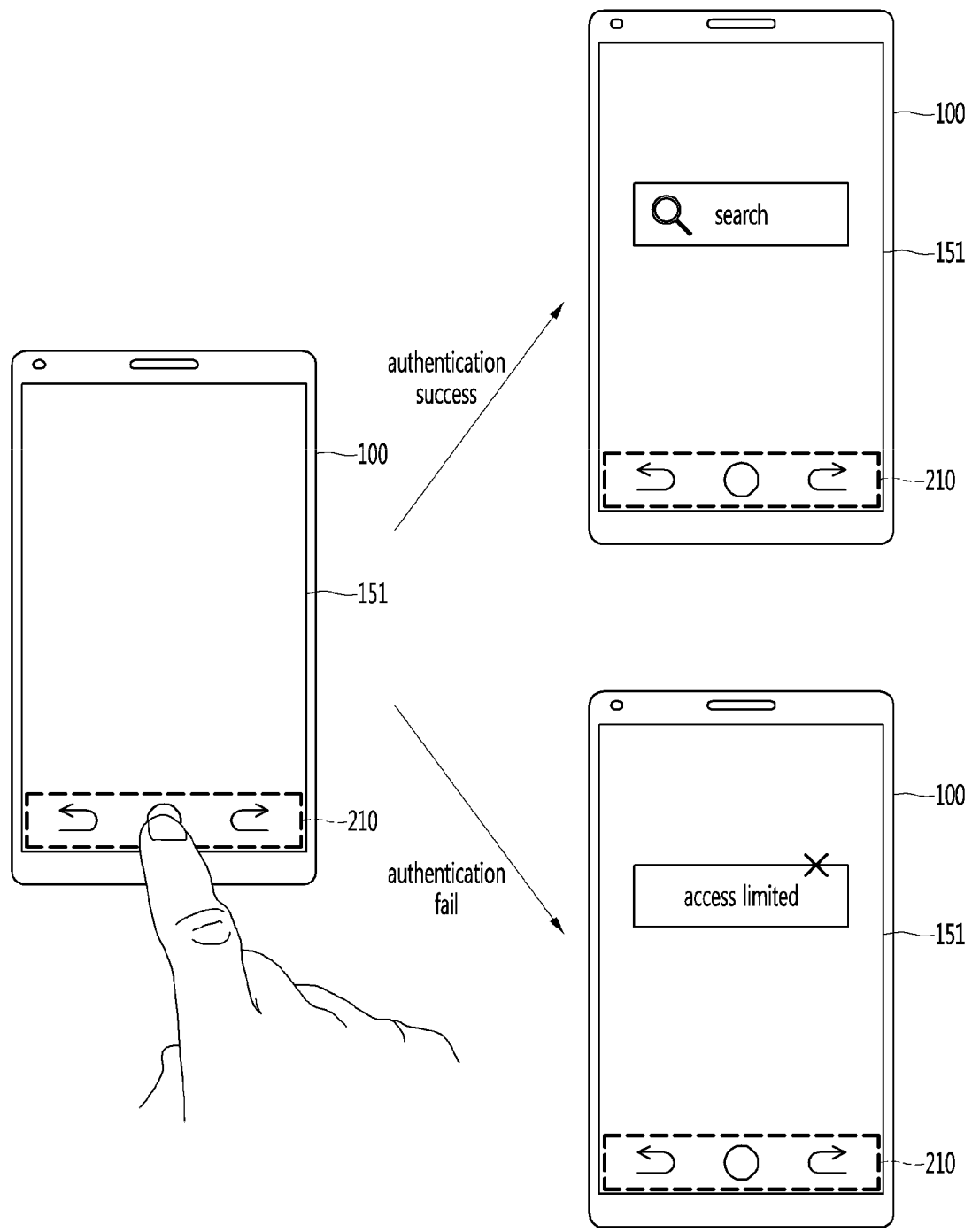
FIG. 13 is a diagram showing a screen displayed by a method of operating a mobile terminal according to one embodiment of the present disclosure.

FIG. 13 is a diagram showing a screen displayed by a method of operating a mobile terminal according to one embodiment of the present disclosure.

According to one embodiment of the present disclosure, user authentication is performed simultaneously with selection of a touch key or function and a menu located in the fingerprint recognizable area 210, thereby executing the touch key or function and the menu.

Specifically, when the user touches and selects a touch key or function and a menu located in the fingerprint recognizable area 210, the fingerprint pattern of the finger is input in the fingerprint recognizable area 210 simultaneously with selection, thereby performing user authentication. When user authentication is successful, the touch key or function and the menu are executed. When user authentication fails, the touch key or function and the menu are not executed. In addition, a message indicating that the user does not have access or execution rights may be displayed.

Referring to FIG. 13, a back key, a home key and forward key are located in the fingerprint recognizable area 210. In this case, assume that, when the home key is touched, the screen is moved to the home screen and, when the home key is long pressed, a search function is executed. In order to perform the search function, the user performs operation of long pressing the home key.

When operation of long pressing the home key located in the fingerprint recognizable area 210 with the finger is received, the fingerprint pattern of the finger is input in the fingerprint recognizable area 210.

When the fingerprint pattern of an authorized user is input, user authentication is successfully performed and thus a search function is executed. In this case, a search window in which a keyword may be input is displayed on the screen.

In contrast, when an unregistered fingerprint pattern of an authorized user is input or the fingerprint pattern of an unauthorized user is input, user authentication fails and thus a search function cannot be executed. In this case, a message indicating that access is restricted is displayed on the screen.

According to the present embodiment, the touch key or function and the menu located in the fingerprint recognizable area 210 may be executed only when user authentication is performed and thus an unauthorized third party cannot execute the touch key or function and the menu. Therefore, it is possible to enhance security of the mobile terminal 100.

Figure 14:
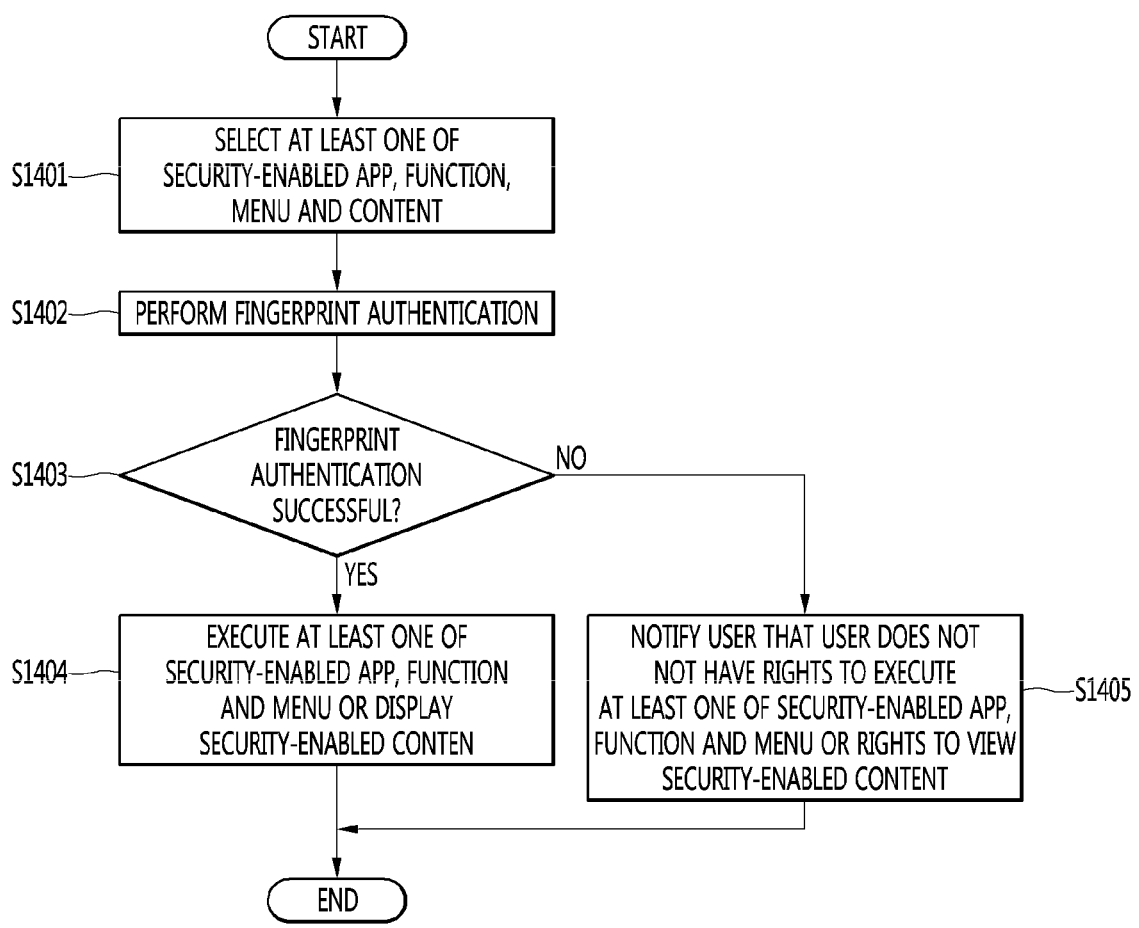
FIG. 14 is a diagram showing a process of operating a mobile terminal according to one embodiment of the present disclosure.

FIG. 14 is a diagram showing a process of operating a mobile terminal according to one embodiment of the present disclosure.

FIG. 14 will be described by referring to FIG. 13.

At least one of the security-enabled app, function, menu and content is selected by user input (S1401).

The security-enabled app, function, menu and content may be located in the fingerprint recognizable area. In this case, the user input may be touch operation, force touch operation, long press operation and drag operation using a finger. Further, the user input may be any type of operation capable of inputting the fingerprint pattern of the finger.

At least one of the security-enabled app, function, menu and content is selected and, at the same time, the mobile terminal 100 performs fingerprint authentication (S1402).

Specifically, when the user touches and selects the security-enabled app, function, menu and content located in the fingerprint recognizable area, the fingerprint pattern of the finger is input in the fingerprint recognizable area simultaneously with selection, thereby performing fingerprint authentication.

The mobile terminal 100 determines whether fingerprint authentication is successful (S1403).

When fingerprint authentication is successful in the fingerprint recognizable area, the selected security-enabled app, function, menu and content may be executed.

Upon determining that the recognized fingerprint pattern matches the fingerprint pattern registered by the user and thus fingerprint authentication is successful in step S1403 (S1403—Yes), the mobile terminal 100 executes at least one of the selected security-enabled app, function and menu or display the security-enabled content (S1404).

In contrast, determining that the recognized fingerprint pattern does not match the fingerprint pattern registered by the user and thus fingerprint authentication fails in step S1403 (S1403—No), the mobile terminal 100 notifies the user that the user does not have rights to execute at least one of the selected security-enabled app, function and menu or rights to view the security-enabled content (S1405). Specifically, the mobile terminal 100 may notify the user that the user does not have access or execution rights in the form of a message, sound, an image or an animation. In this case, the mobile terminal 100 does not execute the selected security-enabled app, function, menu and content.

Figure 15A:
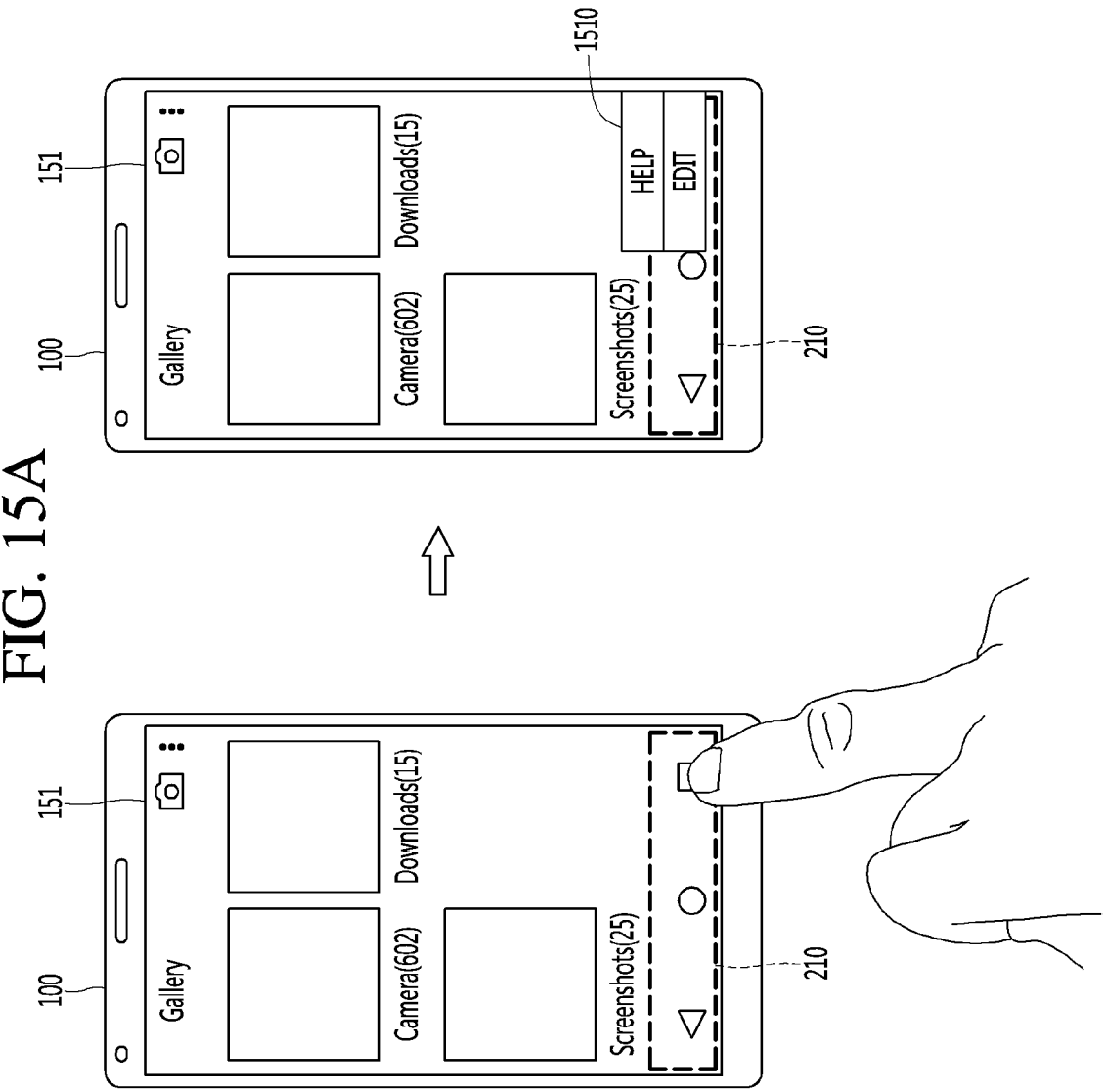
FIGS. 15a and 15b are diagrams showing a screen displayed by a method of operating a mobile terminal according to one embodiment of the present disclosure.
Figure 15B:
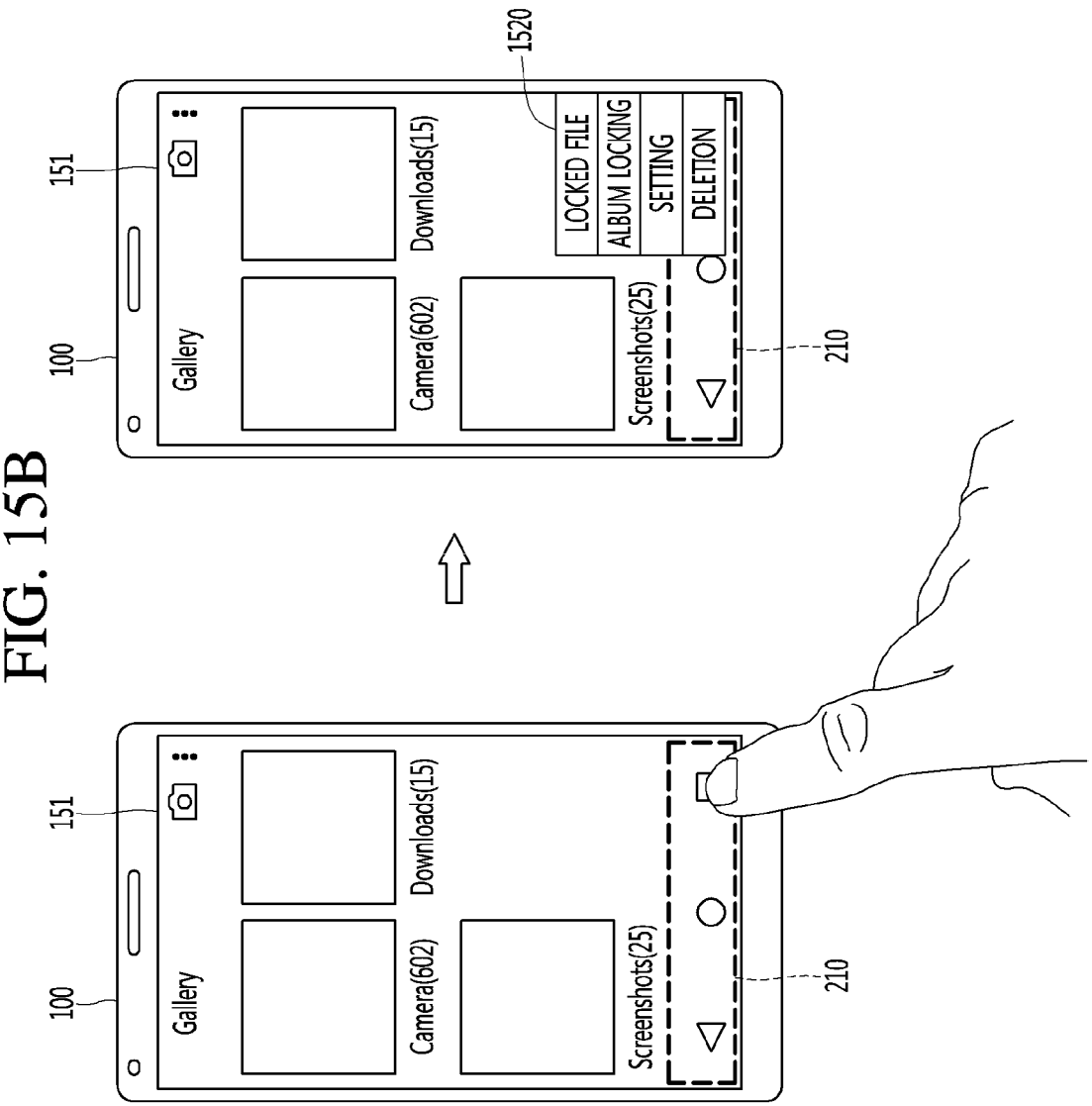

FIGS. 15a and 15b are diagrams showing a screen displayed by a method of operating a mobile terminal according to one embodiment of the present disclosure.

According to one embodiment of the present disclosure, when the touch key is located to overlap the fingerprint recognizable area 210, a security related execution menu may be activated or deactivated in execution of the touch key according to user authentication. Specifically, when the user selects the touch key with a finger having a registered fingerprint, the security related execution menu is activated and displayed and, when the touch key is selected with a finger having an unregistered fingerprint, the security related execution menu is deactivated and is not displayed. To this end, the mobile terminal 100 may know the registered fingerprint pattern information of each finger in advance.

In the present embodiment, security is not enabled in the touch key. Accordingly, an unauthorized third party may select and execute the touch key. However, since the touch key is located in the fingerprint recognizable area 210, the fingerprint is input simultaneously with selection of the touch key, thereby performing user authentication. In this case, the security related execution menu may be activated or deactivated in execution of the touch key, according to user authentication.

When the touch key is executed, a plurality of execution menus may be displayed in correspondence with the function of the touch key. The plurality of execution menus may be classified into a security related execution menu and a basic execution menu. For example, a locked file, album locking and deletion of the execution menus related to a gallery app may be executed by an authorized user and thus may correspond to the security related execution menu. In contrast, help, edit, etc. may not correspond to the security related execution menu but may correspond to the basic execution menu.

FIGS. 15a and 15b illustrate the case where a user selects a touch key located in the fingerprint recognizable area 210 at the lower end of the screen upon executing a gallery app. In addition, assume that the user does not register a right fourth finger but registers a right second finger.

FIG. 15a shows the case where the user selects the touch key using a finger having an unregistered fingerprint. Referring to the left side of FIG. 15a, the user touches and selects a menu key located in the fingerprint recognizable area 210 using the right fourth finger in a state of executing the gallery app. The fingerprint of the right fourth finger is not registered. Accordingly, user authentication fails.

When user authentication fails, the mobile terminal 100 determines that access or execution is tried by an unauthorized person. Accordingly, as shown at the right side of FIG. 15, a menu window 1510 including a basic execution menu such as help and edit excluding a security related execution menu is displayed on the screen. Therefore, even when an unauthorized third party executes the touch key, the security related execution menu is deactivated and thus the third part cannot access or execute the security related execution menu.

FIG. 15b shows the case where the user selects the touch key using a finger having a registered fingerprint. Referring to the left side of FIG. 15a, the user touches and selects a menu key located in the fingerprint recognizable area 210 using the right second finger in a state of executing the gallery app. The fingerprint of the right second finger is registered. Accordingly, user authentication is successful.

When user authentication is successful, the mobile terminal 100 determines that access or execution is tried by an authorized person. Accordingly, as shown at the right side of FIG. 15b, the security related execution menu is activated and a menu window 1520 including a locked file, album locking and deletion is displayed on the screen. Therefore, when the authorized user selects the touch key, the security related execution menu may be activated and displayed, thereby enabling the user to execute the security related execution menu.

The present embodiment is equally applicable to an app, a function and a menu, in addition to the touch key.

Figure 16A:
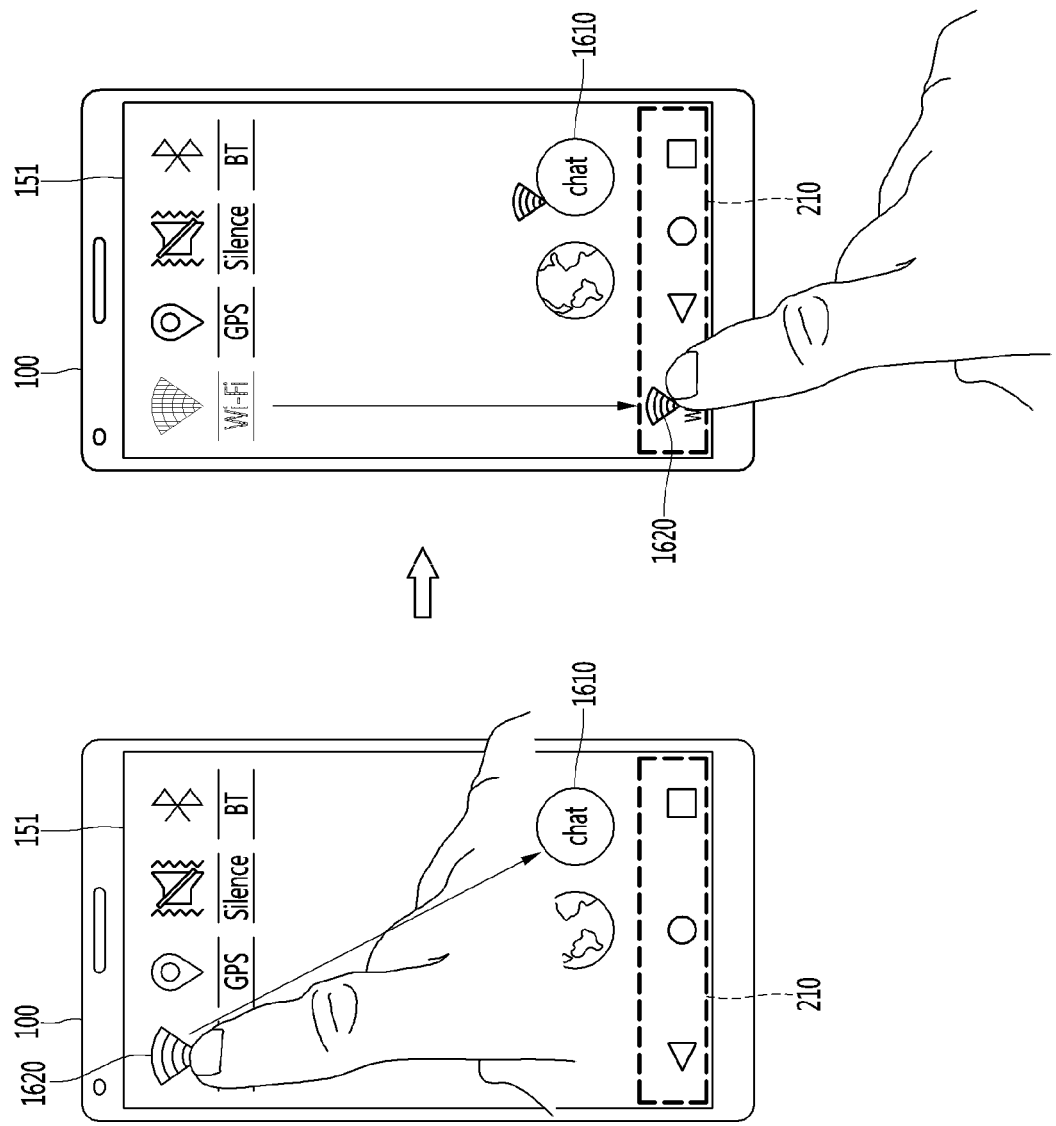
FIGS. 16a and 16b are diagrams showing a screen displayed by a method of operating a mobile terminal according to one embodiment of the present disclosure.
Figure 16B:
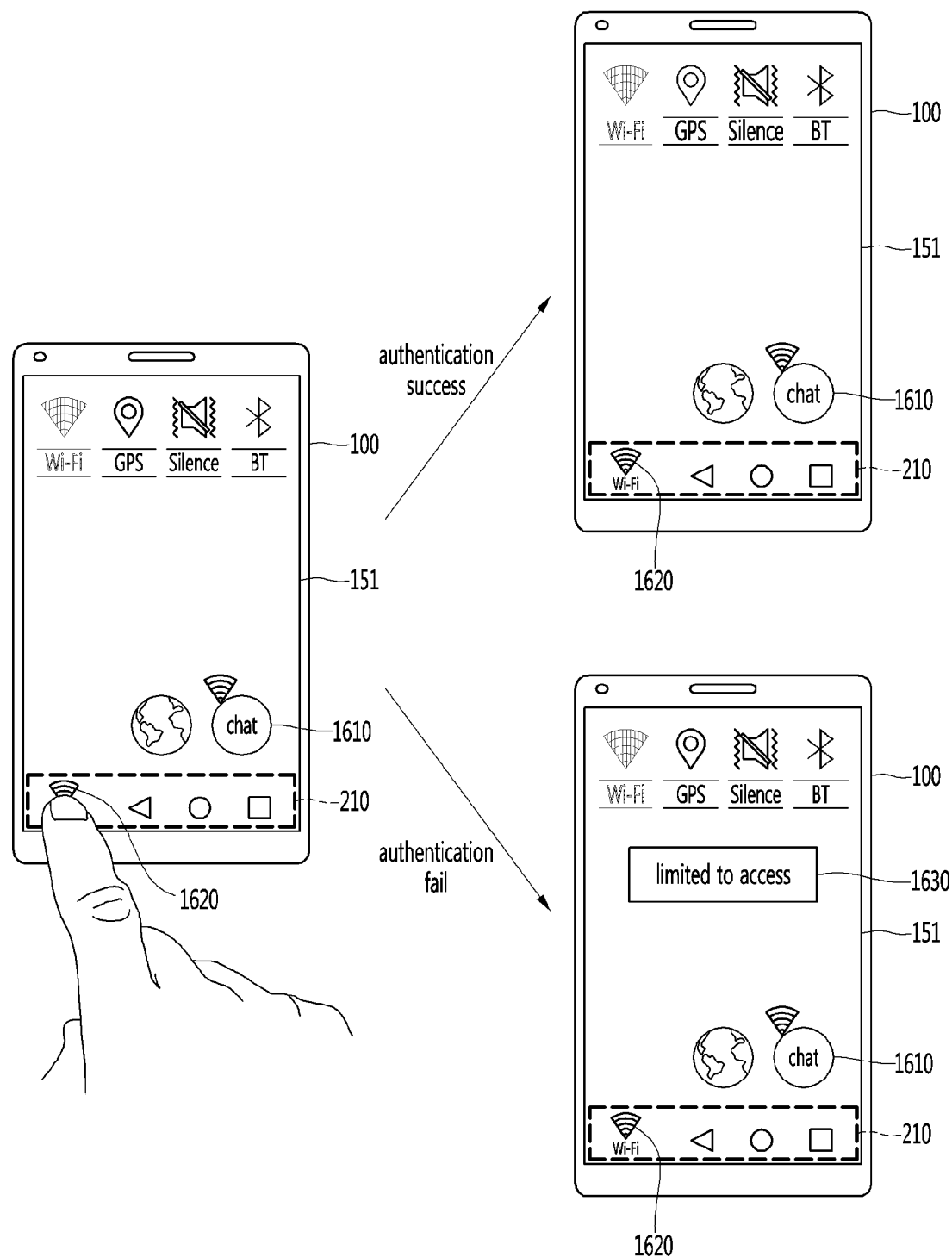

FIGS. 16a and 16b are diagrams showing a screen displayed by a method of operating a mobile terminal according to one embodiment of the present disclosure.

According to one embodiment of the present disclosure, when the location of a setting icon is moved to the fingerprint recognizable area 210, the setting icon at an original location is deactivated and, when user input of selecting the moved setting icon is received, the setting icon may be executed simultaneously with selection.

Specifically, the user may execute the setting icon to turn the operating environment of the mobile terminal 100 on or off. The setting icon may perform selective switching operation switched from ON to OFF or from OFF to ON in correspondence with selection of the user and does not require detailed procedure unlike the other apps or menus. Such a setting icon may be hidden at the upper end of the screen and may be spread and displayed from top to bottom when user's operation of scrolling the upper end of the screen downward is received.

The setting icon may include a Wi-Fi icon, a location (GPS) icon, a vibration icon, a Bluetooth icon and an automatic rotation setting icon. For example, the user may execute the Wi-Fi icon to switch from OFF to ON or from ON to OFF.

When the user drags the setting icon to the fingerprint recognizable area 210, the location of the setting icon may be moved to the fingerprint recognizable area 210. In this case, the setting icon at the original location is deactivated. The deactivated setting icon may not be executed. That is, since the user cannot turn the deactivated setting icon on or off, the deactivated state is distinguished from the OFF state.

The setting icon moved to the fingerprint recognizable area 210 may be executed when user authentication is performed. In this case, user authentication may be performed simultaneously with selection of the setting icon, thereby executing the setting icon. When the user touches and selects the setting icon located in the fingerprint recognizable area with a finger, the fingerprint pattern of the finger is input in the fingerprint recognizable area simultaneously with selection and user authentication is performed based on the fingerprint pattern of the finger.

The authorized user may execute the setting icon to turn the operating environment of the mobile terminal 100 on or off. However, the unauthorized user may not execute the setting icon located in the fingerprint recognizable area and thus may not set the operating environment of the mobile terminal 100.

In the present embodiment, the setting icon moved to the fingerprint recognizable area 210 may be executed by performing user authentication. However, the user may desire to apply the setting of the setting icon to another application without executing the setting icon. For example, in a state in which user authentication is necessary to switch the Wi-Fi setting icon located in the fingerprint recognizable area 210 from OFF to ON to use a Wi-Fi service, the user may desire to execute a specific chatting app based on the Wi-Fi service without switching the Wi-Fi state.

To this end, the user may move the setting icon to overlap a specific app. In this case, the setting icon operates in association with the specific app. For example, when the Wi-Fi setting icon is moved to overlap the chatting app, the Wi-Fi setting may be turned on upon executing the chatting app, without executing the Wi-Fi setting icon. In this case, the chatting app may be executed based on the Wi-Fi service. In addition, when the location (GPS) setting icon is moved to overlap a navigation app, the location setting may be turned on upon executing the navigation app without executing the location setting icon. In this case, the navigation app is executed based on the location service.

At the left side of FIG. 16a, the user moves the Wi-Fi setting icon 1620 to overlap a chatting app icon 1610. In this case, the chatting app is executed based on the Wi-Fi service. An identifier indicating the Wi-Fi service is displayed in the chatting app icon 1610 to be perceived by the user. Thereafter, when the user executes the chatting app, the Wi-Fi setting may be turned on without executing the Wi-Fi setting icon. As shown at the right side of the figure, the user drags the Wi-Fi setting icon 1620 to the fingerprint recognizable area 210. When the Wi-Fi setting icon 1620 is moved to the fingerprint recognizable area 210, the icon located at the original location is deactivated.

In this state, as shown at the left side of FIG. 16b, the user touches and selects the Wi-Fi setting icon 1620 moved to the fingerprint recognizable area 210. If user authentication is successful, the Wi-Fi setting may be executed. Specifically, the user may switch the Wi-Fi from ON to OFF or from OFF to ON. In contrast, if user authentication fails, the Wi-Fi setting may not be executed and a message 1630 indicating that the user does not have access right is displayed on the screen.

Figure 17:
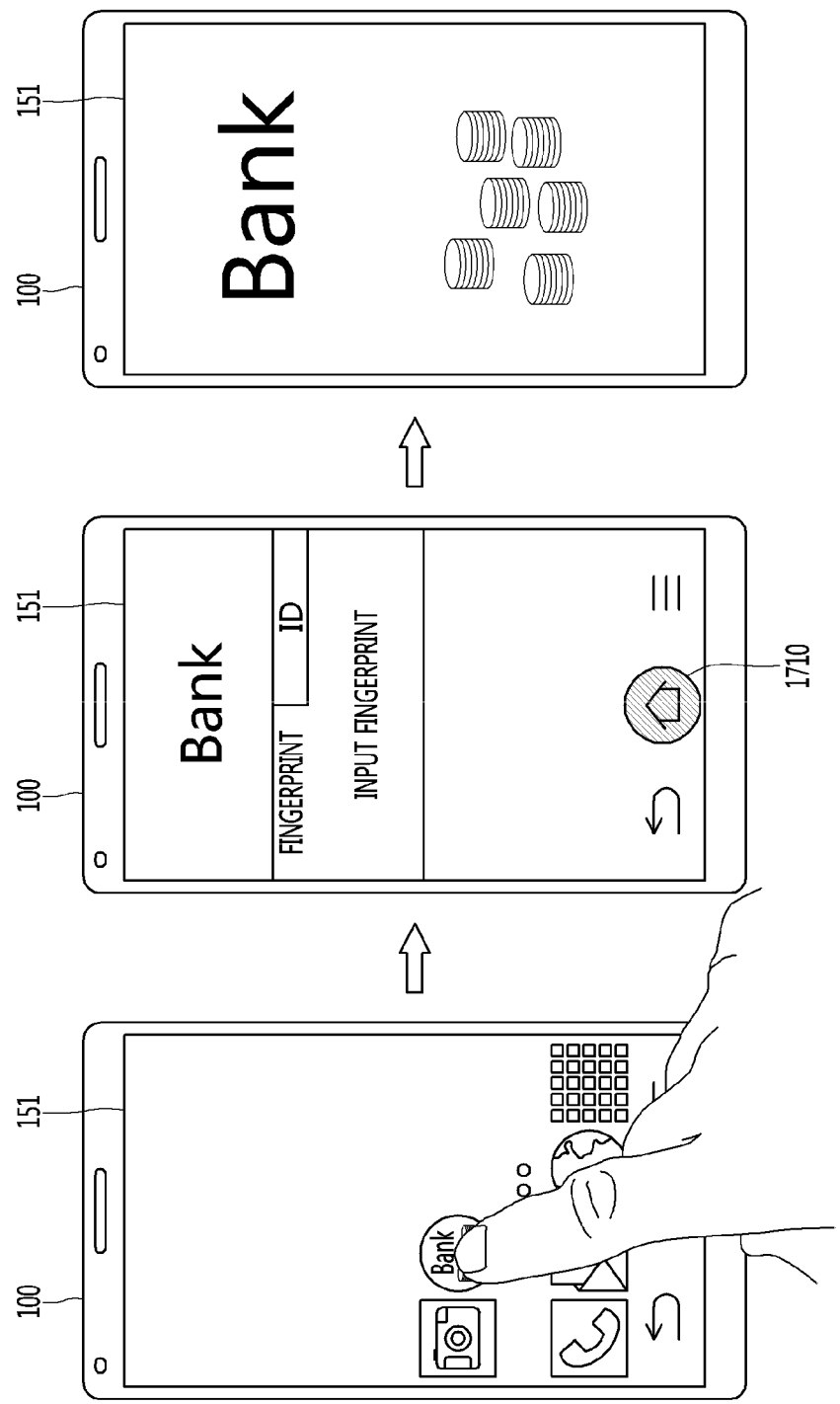
FIG. 17 is a diagram showing a screen displayed by a method of operating a mobile terminal according to one embodiment of the present disclosure.

FIG. 17 is a diagram showing a screen displayed by a method of operating a mobile terminal according to one embodiment of the present disclosure.

According to one embodiment of the present disclosure, if the security-enabled app is executed, the fingerprint recognizable area may be activated. The fingerprint recognizable area may be maintained in the deactivated state and then may be activated when the security-enabled app is executed.

When the security-enabled app is executed, a screen for inputting a password or performing certificate verification is displayed. In this case, the fingerprint recognizable area located at the lower end of the screen is activated. The fingerprint recognizable area may be displayed in a blinking manner or may be displayed in the form of a dotted line, thereby being perceived by the user. Alternatively, a GUI effect such as blinking or vibration of a touch key for inputting a fingerprint may be generated.

When the user executes the security-enabled app, the user may enter the app or use the menu in the app by performing fingerprint authentication instead of password input.

In FIG. 17, the basic home screen is displayed on the display unit 151 of the mobile terminal 100. A telephone icon, a text message icon, an Internet icon, a camera icon and a bank app icon are displayed on the basic home screen. Touch keys such as a forward key, a home key and a menu key and the fingerprint recognizable area are displayed at the lower end of the basic home screen. However, since the fingerprint recognizable area is in the deactivated state, a fingerprint cannot be recognized.

When the user selects and executes the bank app, the fingerprint recognizable area is activated. In this case, the home key 1710 at the lower end of the screen may be illuminated such that the user perceives a location where the fingerprint is input. In this case, the user puts on the home key 1710 to perform fingerprint authentication. When fingerprint authentication is successful, the user may enter the bank app.

FIG. 18 is a diagram showing a process of operating a mobile terminal according to one embodiment of the present disclosure.

This figure will be described based on FIG. 17.

At least one of the security-enabled app, function, menu and content is executed by user input (S1801).

The user input may be touch operation, force touch operation, haptic touch operation, long press operation and drag operation input to the display unit of the mobile terminal using the finger of the user.

When at least one of the security-enabled app, function, menu and content is executed, the mobile terminal activates the fingerprint recognizable area (S1802).

The mobile terminal 100 displays the fingerprint recognizable area to be identified by the user (S1803).

Specifically, when the user touches the fingerprint recognizable area, a haptic effect for vibrating the fingerprint recognizable area or a GUI effect for displaying the fingerprint recognizable area in a wavy pattern may be generated. Alternatively, the fingerprint recognizable area or the touch key for inputting the fingerprint may be changed and displayed in an identifiable form. For example, the boundary of the fingerprint recognizable area or the touch key may be indicated in the form of a dotted line, the fingerprint recognizable area or the touch key may be displayed in a blinking manner or the fingerprint recognizable area or the touch key may be illuminated.

When the user inputs a fingerprint, the mobile terminal 100 performs fingerprint authentication (S1804).

Figure 19B:
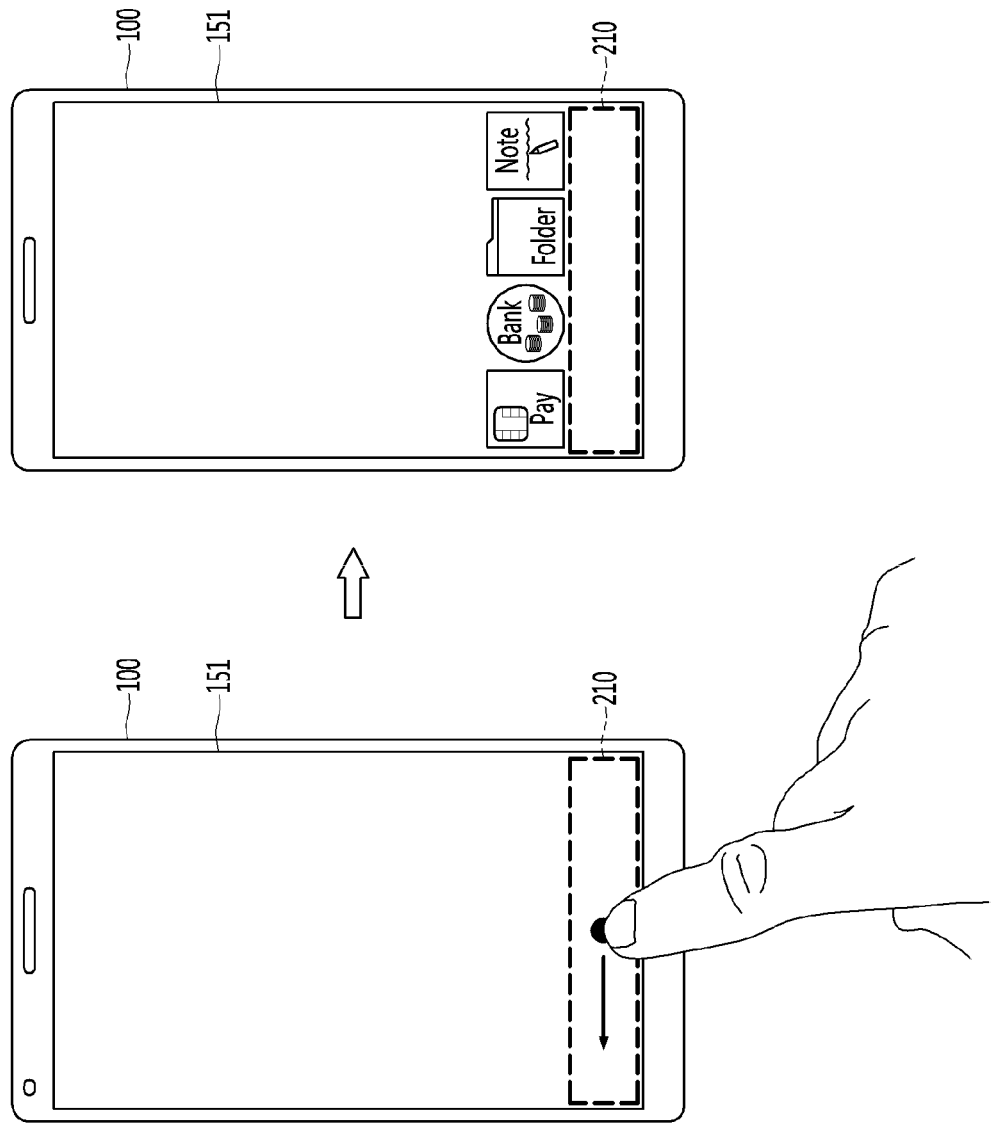

FIGS. 19a and 19b are diagrams showing a screen displayed by a method of operating a mobile terminal according to one embodiment of the present disclosure.

According to one embodiment of the present disclosure, in a state in which the screen is turned off or locked, switching between the basic home screen and the security home screen may be performed according to user input received in the fingerprint recognizable area.

To this end, the fingerprint recognizable area is deactivated not to perform fingerprint authentication when operation of touching and dragging the fingerprint recognizable area from the left side to the right side is received, and is activated to perform finger authentication when operation of touching and dragging the fingerprint recognizable area from the right side to the left side is received.

The security home screen may be displayed only when user authentication is performed and the basic home screen may be displayed when user authentication is not performed.

FIG. 19a shows the case of switching to the basic home screen in a state in which the screen is turned off or locked. When the user touches and drags the fingerprint recognizable area 210 from the left side to the right side in a state in which the screen is turned off or locked, fingerprint authentication is not performed in the fingerprint recognizable area 210. Accordingly, the security home screen may not be displayed and the basic home screen is displayed.

FIG. 19b shows the case of switching to the security home screen in a state in which the screen is turned off or locked. When the user touches and drags the fingerprint recognizable area 210 from the right side to the left side in a state in which the screen is turned off or locked, fingerprint authentication is performed in the fingerprint recognizable area 210. When the user touches and drags the fingerprint recognizable area 210, the fingerprint pattern is input in the fingerprint recognizable area 210 and fingerprint authentication is performed based on the fingerprint pattern. In this case, the security home screen is displayed.

When the user touches and drags the fingerprint recognizable area 210 from the left side to the right side in a state in which the security home screen is displayed, the screen is switched to the basic home screen.

Figure 20A:
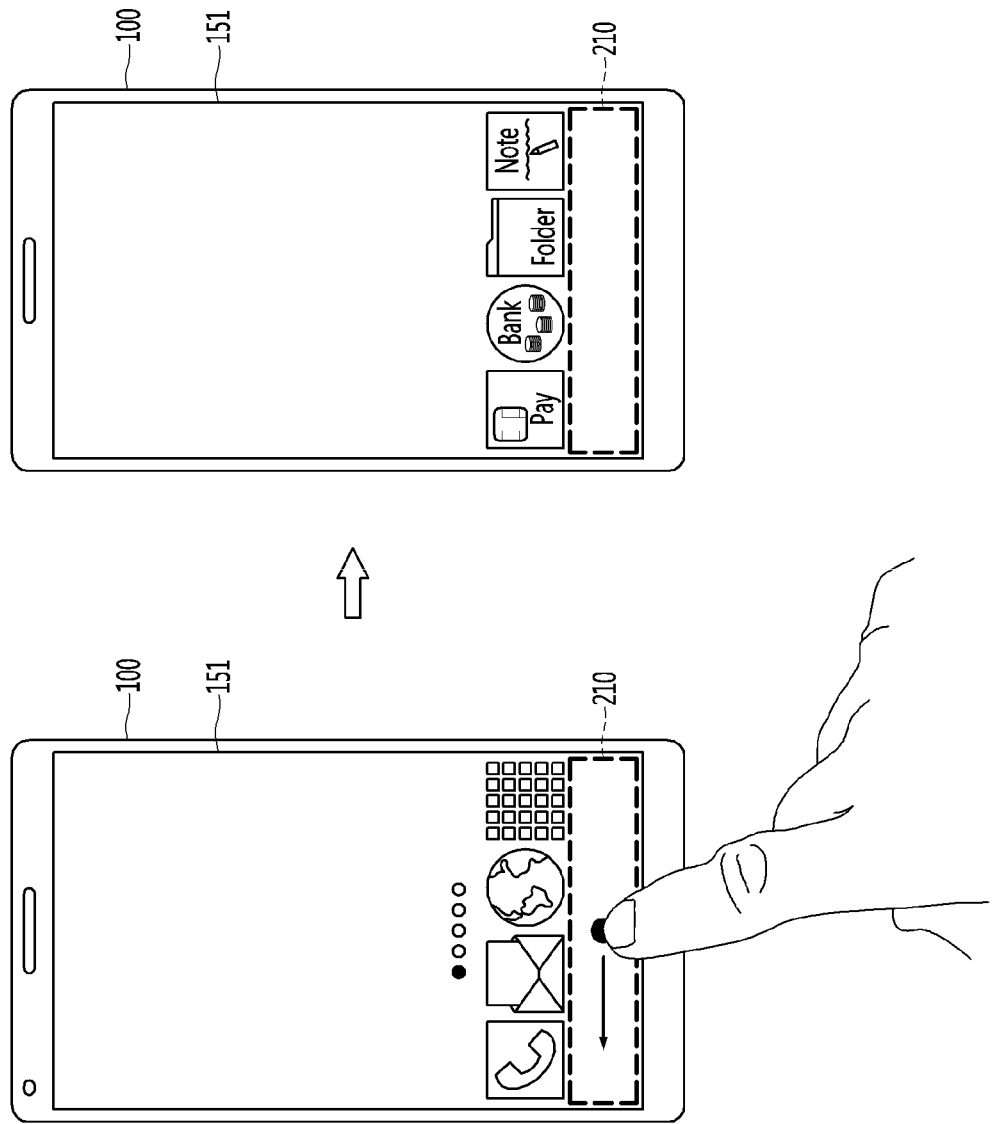

FIGS. 20a and 20b are diagrams showing a screen displayed by a method of operating a mobile terminal according to one embodiment of the present disclosure.

According to one embodiment of the present disclosure, user authentication may be performed according to user input received in the fingerprint recognizable area in a state in which the basic home screen or the security home screen is executed, and switching between the basic home screen and the security home screen may be performed.

Specifically, the mobile terminal 100 may switch to the security home screen when operation of touching and dragging the fingerprint recognizable area from the right side to the left side is received in a state of displaying the basic home screen, and switch to the basic home screen when operation of touching and dragging the fingerprint recognizable area from the left side to the right side is received in a state of displaying the security home screen.

FIG. 20*a* shows the case of switching to the security home screen in a state in which the basic home screen or the app is executed. When the user drags the fingerprint recognizable area 210 from the right to the left, the fingerprint pattern is input in the fingerprint recognizable area 210 and fingerprint authentication is performed in the fingerprint recognizable area 210 based on the fingerprint pattern. When fingerprint authentication is successful, the basic home screen is switched to the security home screen.

FIG. 20*b* shows the case of switching to the basic home screen in a state in which the security home screen or the app is executed. When the user touches and drags the fingerprint recognizable area 210 from the left side to the right side, the fingerprint pattern is input in the fingerprint recognizable area 210, and fingerprint authentication is performed in the fingerprint recognizable area 210 based on the fingerprint pattern. When fingerprint authentication is successful, the security home screen is switched to the basic home screen.

FIG. 21 is a diagram showing a screen displayed by a method of operating a mobile terminal according to one embodiment of the present disclosure.

According to one embodiment of the present disclosure, when user input of touching and dragging the finger from the fingerprint recognizable area 210 to a fingerprint unrecognizable area is received in a state in which the screen is turned off, a payment widget may be executed.

The user input may be operation of touching the fingerprint recognizable area 210 with the finger and dragging the finger from the fingerprint recognizable area 210 to the fingerprint unrecognizable area. User's touch may be operation of performing touch simultaneously with long press, in order to accurately input the fingerprint pattern. When the user touches the fingerprint recognizable area 210 with the finger, user authentication is performed. Therefore, the payment widget may be executed and a payment card is displayed, without a user authentication procedure.

In FIG. 21, an area of the display unit 151 excluding the fingerprint recognizable area 210 is a fingerprint unrecognizable area. When the user touches the fingerprint recognizable area 210 with the finger and then drags the finger to the fingerprint unrecognizable area, the payment widget is executed and the payment card is displayed.

When the user desires to execute the payment widget, the user may execute the payment widget by performing operation of taking out a card hidden in the lower end of the screen. For example, the payment widget may be executed by pushing up the lower end of the screen upward and the payment procedure may be performed by performing user authentication.

In the present disclosure, in a process of executing the payment widget, if touch operation is received in the fingerprint recognizable area, user authentication may be performed and the payment procedure may be performed without an additional user authentication procedure.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a display unit including a fingerprint recognizable area in which a fingerprint input is recognizable and a fingerprint unrecognizable area in which the fingerprint input is unrecognizable;
a finger scan sensor built in a lower end of the display unit to correspond to the fingerprint recognizable area to recognize the fingerprint input to the display unit; and
a controller that:
controls the finger scan sensor to recognize the fingerprint input simultaneously with a drag operation, and
selectively executes a security home screen or a basic home screen depending on whether a first fingerprint authentication is successfully performed based on the fingerprint input recognized by the finger scan sensor,
when the drag operation of dragging a finger from any one of the fingerprint recognizable area and the fingerprint unrecognizable area to the other area is input to the display unit when a screen of the mobile terminal is turned off or is locked,
wherein the security home screen is executed when the drag operation of dragging the finger to the fingerprint recognizable area is received and the first fingerprint authentication is successfully performed based on the fingerprint input recognized by the finger scan sensor,
wherein the basic home screen is executed when the drag operation of dragging the finger is received in the fingerprint unrecognizable area only,
wherein each of the security home screen and the basic home screen is a main screen first displayed when the screen of the mobile terminal is turned on or is unlocked and includes at least one security-enabled app, and wherein the controller further:
displays the at least one security-enabled app to be located in the fingerprint recognizable area when the security home screen is executed, and
executes the at least one security-enabled app when a second fingerprint authentication is successfully performed simultaneously with a touch input selecting the at least one security-enabled app displayed in the fingerprint recognizable area.

2. The mobile terminal according to claim 1, wherein the controller:
executes the basic home screen when the first fingerprint authentication fails.

3. The mobile terminal according to claim 1, wherein, when the drag operation from the fingerprint recognizable area to the fingerprint unrecognizable area is input and the first fingerprint authentication is successful, the controller executes a payment widget.

4. The mobile terminal according to claim 1, wherein the security home screen further includes at least one of a menu, a function and content requiring user authentication for execution, and
wherein the controller displays the at least one of the menu, function and content to be located in the fingerprint recognizable area.

5. The mobile terminal according to claim 4, wherein, when a touch operation of touching at least one of the menu, function and content located in the fingerprint recognizable area with the finger is input, the controller executes the at least one of the menu, function and content when the second fingerprint authentication is successfully performed simultaneously with the touch operation touching the at least one of the menu, function and content displayed in the fingerprint recognizable area.

6. The mobile terminal according to claim 1, wherein the basic home screen and the security home screen further include at least one of the security-enabled app, menu, function and content requiring user authentication for execution, and
wherein, when the drag operation includes moving the finger to the fingerprint recognizable area in which the finger is in contact with at least one of the security-enabled app, menu, function and content, the controller recognizes the fingerprint input simultaneously with the drag operation to perform the first fingerprint authentication and executes at least one of the security-enabled app, menu, function and content when the first fingerprint authentication is successful.

7. The mobile terminal according to claim 1, wherein, when the drag operation includes moving the finger from any one of the fingerprint recognizable area and the fingerprint unrecognizable area to the other area, the controller performs at least one of an operation of vibrating the display unit, an operation of displaying a wavy pattern on the display unit and an operation of changing and displaying a GUI theme of the display unit.

8. A method of operating a mobile terminal, the method comprising:
inputting a drag operation of dragging a finger from any one of a fingerprint recognizable area of a display unit in which a fingerprint input is recognizable and a fingerprint unrecognizable area of the display unit in which the fingerprint input is unrecognizable to the other area;
recognizing, via a finger scan sensor built in a lower end of the display unit, the fingerprint input simultaneously with the drag operation;
performing, via a controller, a first fingerprint authentication based on the recognized fingerprint; and
selectively executing, via the controller, a security home screen or a basic home screen depending on whether the first fingerprint authentication is successful when a screen of the mobile terminal is turned off or is locked,
wherein the security home screen is executed when a drag operation of dragging a finger to the fingerprint recognizable area is received and the first fingerprint authentication is successfully performed based on the fingerprint input recognized by the finger scan sensor,
wherein the basic home screen is executed when the drag operation of dragging the finger is received in the fingerprint unrecognizable area only,
wherein each of the security home screen and the basic home screen is a main screen first displayed when the screen of the mobile terminal is turned on or is unlocked and includes at least one security-enabled app, and
wherein the method further comprises:
displaying, via the controller, the at least one security-enabled app to be located in the fingerprint recognizable area when the security home screen is executed; and
executing, via the controller, the at least one security-enabled app when a second fingerprint authentication is successfully performed simultaneously with a touch input selecting the at least one security-enabled app displayed in the fingerprint recognizable area.

9. The method according to claim 8,
wherein the basic home screen is executed when the first fingerprint authentication fails.

10. The method according to claim 8, wherein, when the drag operation from the fingerprint recognizable area to the fingerprint unrecognizable area is input and the first fingerprint authentication is successful, a payment widget is executed.

11. The method according to claim 8, wherein the security home screen further includes at least one of a menu, a function and content requiring user authentication for execution, and
wherein the at least one of the menu, function and content is displayed to be located in the fingerprint recognizable area.

12. The method according to claim 11, wherein, when a touch operation of touching at least one of the menu, function and content located in the fingerprint recognizable area with the finger is input, the method further comprises executing the at least one of the menu, function and content when the second fingerprint authentication is successfully performed simultaneously with the touch operation touching the at least one of the menu, function and content displayed in the fingerprint recognizable area.

13. The method according to claim 8, wherein the basic home screen and the security home screen further include at least one of the security-enabled app, menu, function and content requiring user authentication for execution, and
wherein, when the drag operation includes moving the finger to the fingerprint recognizable area in which the finger is in contact with at least one of the security-enabled app, menu, function and content, the fingerprint input simultaneously with the drag operation is recognized to perform the first fingerprint authentication and at least one of the security-enabled app, menu, function and content is executed when the first fingerprint authentication is successful.

14. The method according to claim 8, wherein, when the drag operation includes moving the finger from any one of the fingerprint recognizable area and the fingerprint unrecognizable area to the other area, at least one of an operation of vibrating the display unit, an operation of displaying a wavy pattern on the display unit, and an operation of changing and displaying a GUI theme of the display unit is performed.

\* \* \* \* \*